United States Patent
Gerszberg et al.

(10) Patent No.: US 6,229,810 B1
(45) Date of Patent: *May 8, 2001

(54) NETWORK SERVER PLATFORM FOR A HYBRID FIBER TWISTED PAIR LOCAL LOOP NETWORK SERVICE ARCHITECTURE

(75) Inventors: Irwin Gerszberg, Kendall Park; Kenny Xiaojian Huang, Somerset; Christopher K. Kwabi, Englewood; Sumit Roy, Scotch Plains; Gabriel Valdez, Jersey City, all of NJ (US)

(73) Assignee: AT&T CORP, New York, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/001,582

(22) Filed: Dec. 31, 1997

(51) Int. Cl.[7] .................................................. H04L 12/66
(52) U.S. Cl. .......................................... 370/401; 370/906
(58) Field of Search ................................... 370/359, 365, 370/395, 401, 403, 404, 405, 419, 452, 460, 463, 493, 524, 906; 379/230

(56) References Cited

U.S. PATENT DOCUMENTS

| | | |
|---|---|---|
| 4,456,925 | 6/1984 | Skerlog et al. . |
| 4,620,289 | 10/1986 | Chauvel . |
| 4,725,694 | 2/1988 | Auer et al. . |
| 4,916,441 | 4/1990 | Gombrioh . |
| 5,014,267 | 5/1991 | Tompkins et al. . |
| 5,157,717 | 10/1992 | Hitchcock . |
| 5,335,276 | 8/1994 | Thompson et al. . |
| 5,393,964 | 2/1995 | Hamilton et al. . |
| 5,406,615 | 4/1995 | Miller, II et al. . |
| 5,488,412 | 1/1996 | Majeti et al. . |

(List continued on next page.)

OTHER PUBLICATIONS

U.S. Pat. application No. 08/943,312 filed Oct. 14, 1997, entitled Wideband Communication System for the Home, to Robert R. Miller ,II and Jesse E. Russell, 21 pages.

U.S. Pat. application No. 08/858,170 filed May 14, 1997, entitled Wide Band Transmission Through Wire, to Robert R. Miller, II, Jesse E. Russell and Richard R. Shively, 15 pages.

*Primary Examiner*—Hassan Kizou
*Assistant Examiner*—Ahmed Elallam

(57) ABSTRACT

This invention provides a network server platform forming part of a new local loop network architecture designed to overcome the limitations of current art local access loop technologies. This invention allows end users to seamlessly connect to the numerous disparate networks in order to access the multiplicity of services that these networks have to offer. The network server platform allows interconnection between networks with varying networking protocols. The network server platform is a key component of the new architecture and interacts to allow for easy and seamless integration with network components on both the local access level as well as the core network. The network server platform offers external networking capabilities to the local access network. As a result, the local access network terminates on the network server platform. The network server platform provides subscribers or end users the capabilities to access services from a multiplicity of disparate networks offering a variety of services.

14 Claims, 30 Drawing Sheets

U.S. PATENT DOCUMENTS

| | | |
|---|---|---|
| 5,512,935 | 4/1996 | Majeti et al. . |
| 5,534,913 | 7/1996 | Majeti et al. . |
| 5,546,316 | 8/1996 | Buckley et al. . |
| 5,561,604 | 10/1996 | Buckley et al. . |
| 5,572,005 | 11/1996 | Hamilton et al. . |
| 5,583,965 | 12/1996 | Douma et al. . |
| 5,584,054 | 12/1996 | Tyneski et al. . |
| 5,587,735 | 12/1996 | Ishida et al. . |
| 5,610,910 * | 3/1997 | Focsaneanu et al. ............... 370/351 |
| 5,619,684 | 4/1997 | Goodwin et al. . |
| 5,644,628 | 7/1997 | Schwarzer et al. . |
| 5,671,267 | 9/1997 | August et al. . |
| 5,682,195 | 10/1997 | Hendricks et al. . |
| 5,684,918 | 11/1997 | Abecassis . |
| 5,712,903 * | 1/1998 | Bartholomew et al. ............ 379/88.2 |
| 5,940,598 * | 8/1999 | Strauss et al. ...................... 370/466 |
| 5,987,497 * | 11/1999 | Allgeier ............................... 709/201 |
| 5,991,292 * | 12/1999 | Focsaneanu et al. ................ 370/352 |

* cited by examiner

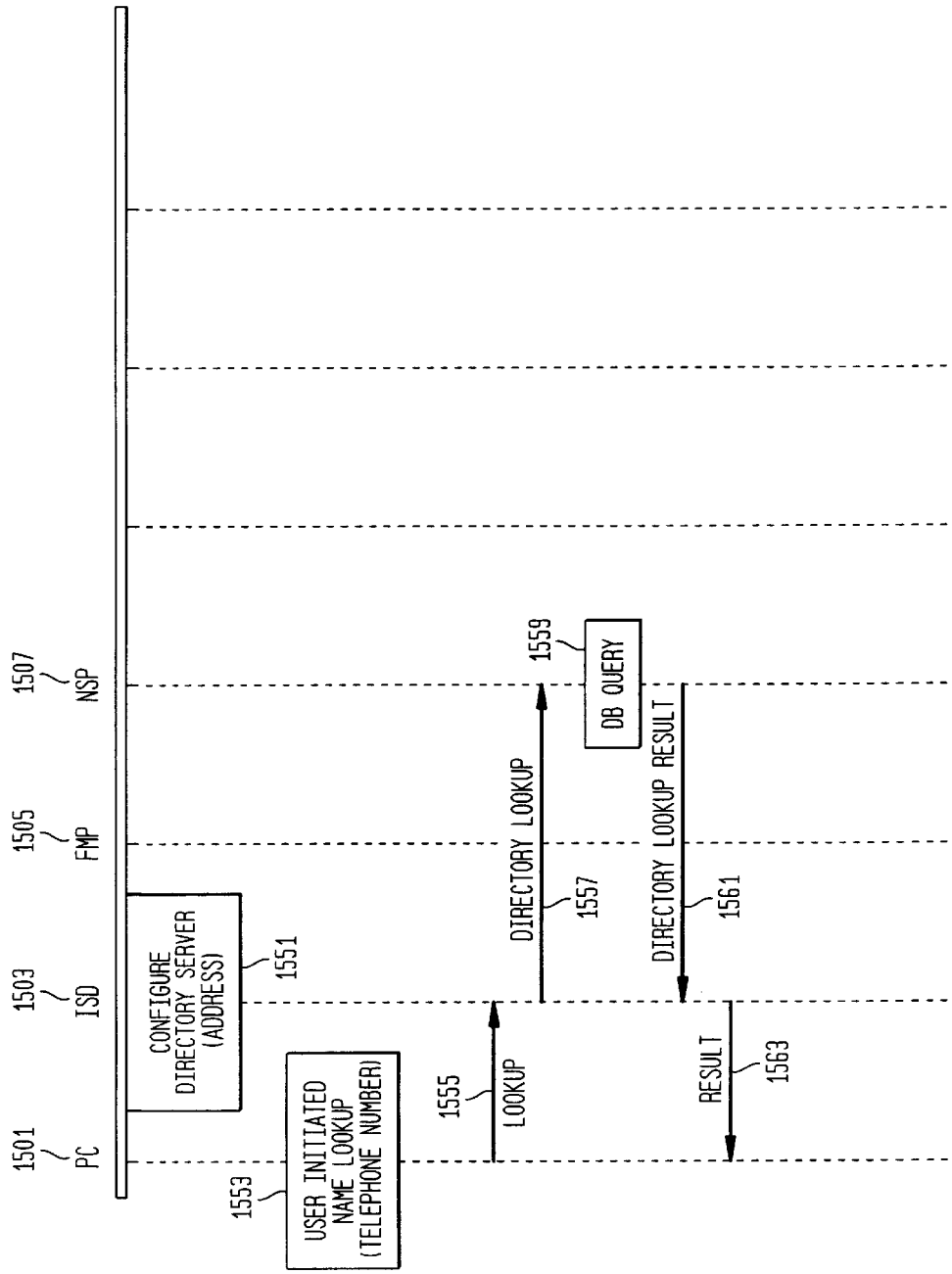

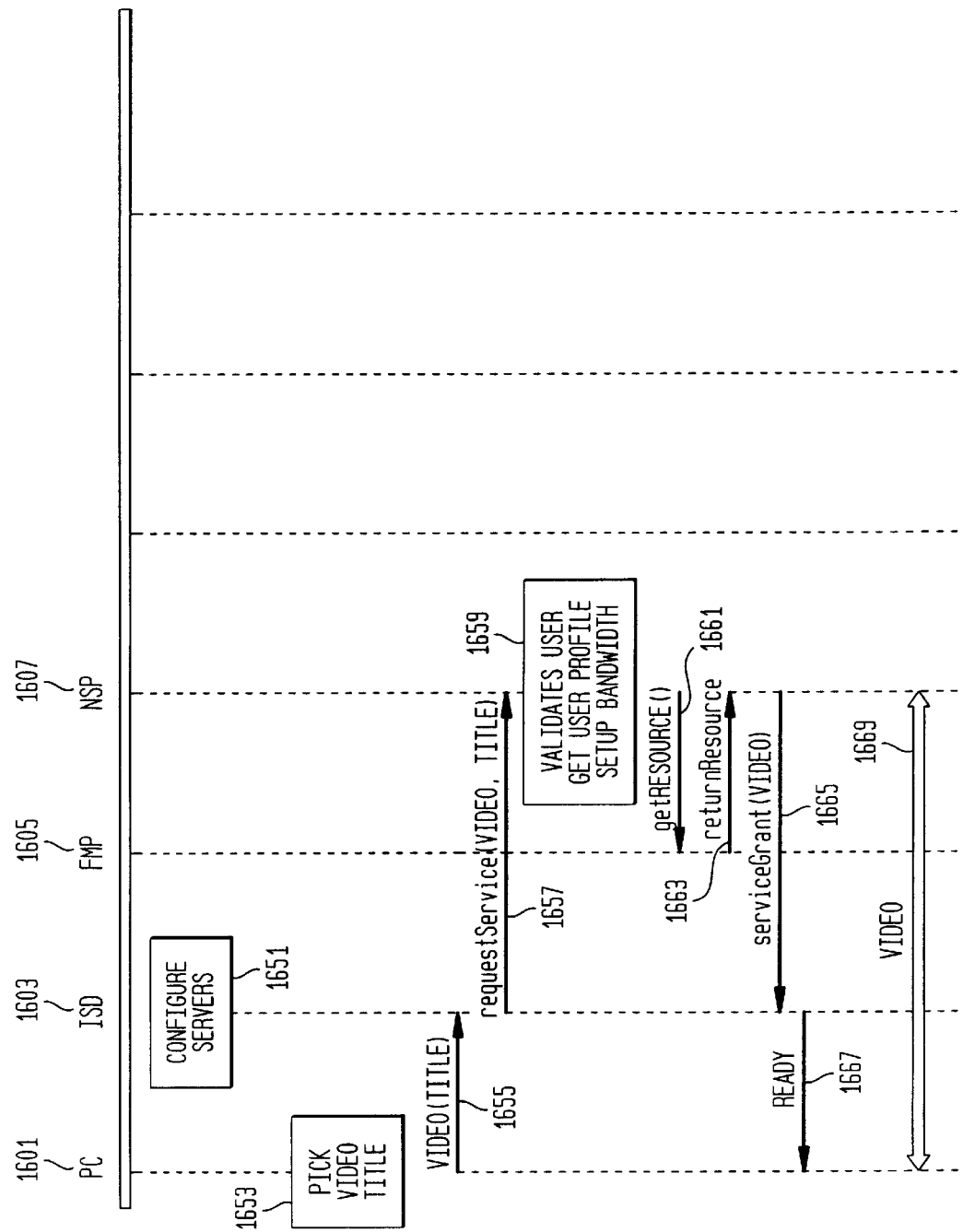

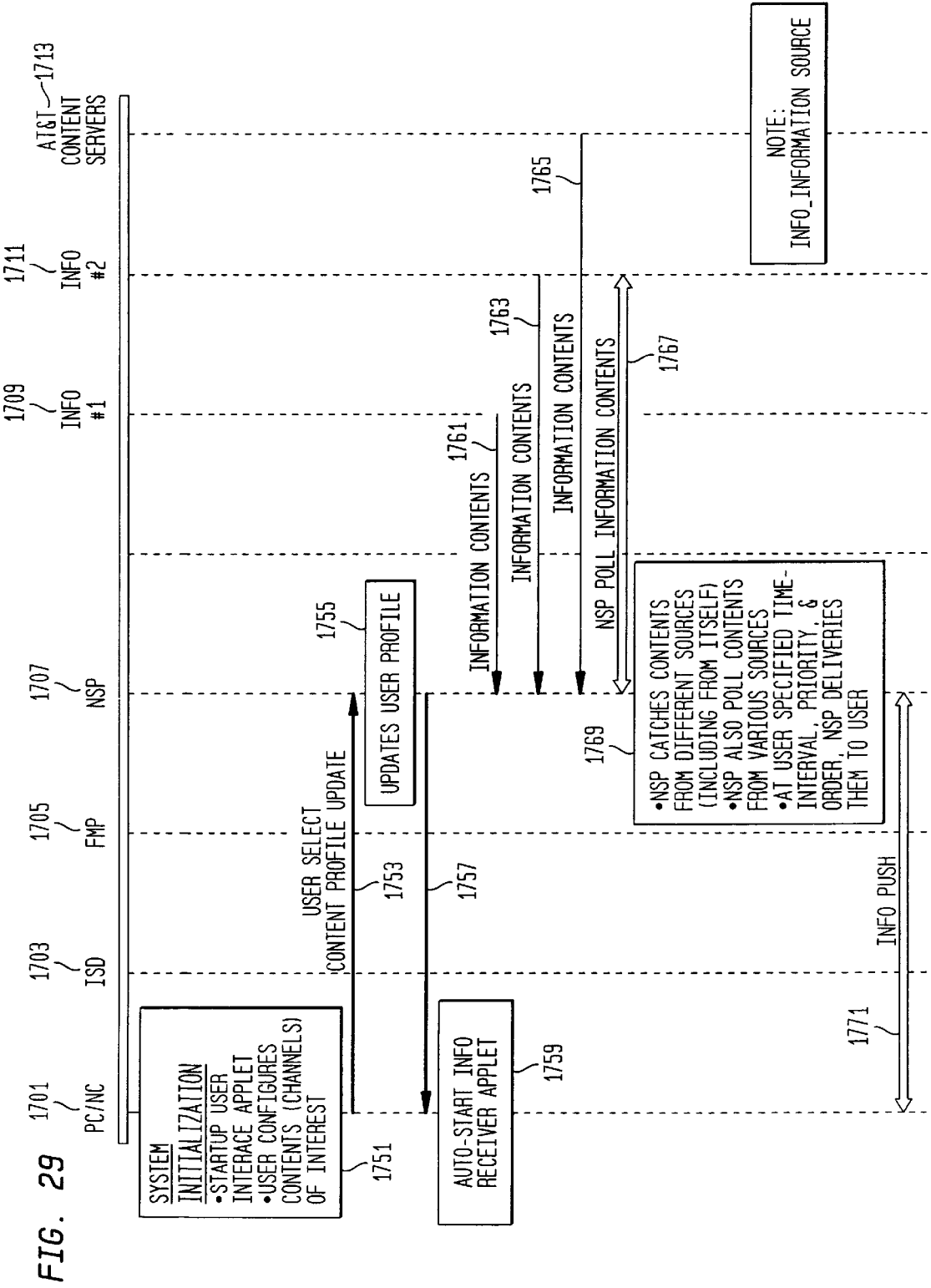

NETWORK SERVER PLATFORM FOR A HYBRID FIBER TWISTED PAIR LOCAL LOOP NETWORK SERVICE ARCHITECTURE

FIELD OF THE INVENTION

This invention discloses a network server platform that terminates the network layer of the local access loop and handles connection management between the local access facilities and the communications network for maintaining services for those facilities.

BACKGROUND

As deregulation of the telephone industry continues and as companies prepare to enter the local telephone access market, there is a need to offer new and innovative services that distinguish common carriers from their competitors. This cannot be accomplished without introducing new local access network architectures that will be able to support these new and innovative services.

Conventionally, customer premises telephone and/or data connections contain splitters for separating analog voice calls from other data services such as Ethernet transported over digital subscriber line (DSL) modems. Voice band data and voice signals are sent through a communications switch in a central or local office to an interexchange carrier or Internet service provider. DSL data is sent through a digital subscriber loop asynchronous mode (DSLAM) switch which may include a router. The DSLAM switch connects many lines and routes the digital data to a telephone company's digital switch.

A major problem with this configuration is that interexchange carriers attempting to penetrate the local telephone company's territory must lease trunk lines from the local telephone company switch to the interexchange company's network for digital traffic. Furthermore, the Internet service provider must lease a modem from the local phone company in the DSLAM switch and route its data through the local phone company's digital switch. Thus, the local phone company leases and/or provides a significant amount of equipment, driving up the cost of entry for any other company trying to provide local telephone services and making it difficult for the interexchange companies to differentiate their services. Furthermore, since DSL modem technology is not standardized, in order to ensure compatibility, the type of DSL modem provided by the local telephone company must also be provided to the end user in the customer premises equipment (CPE). Additionally, since the network is not completely controlled by the interexchange companies, it is difficult for the interexchange companies to provide data at committed delivery rates. Any performance improvements implemented by the interexchange companies may not be realized by their customers, because the capabilities of the local telephone company equipment may or may not meet their performance needs and/or desired quality levels. Thus, it is difficult for the interexchange companies to convince potential customers to switch to their equipment or to use their services. These factors ensure the continued market presence of the local telephone company.

As part of this system, there is a need for improved architectures, services and equipment utilized to distinguish the interexchange companies' products and services. Current local access network topologies suffer from major drawbacks which limit their applications and their ability to expand with changing technology. Interexchange companies are restricted by the current infrastructure and are limited in the number and variety of new and enhanced services that can be offered to end users. In the expansion of new services, end users desire a seamless connect to the numerous disparate networks in order to access the multiplicity of services that these networks have to offer. The network server platform allows interconnection between networks with varying networking protocols.

SUMMARY OF THE INVENTION

In order to provide an improved network, it is desirable for the interexchange companies to have access to at least one of the twisted-pair lines or alternate wireless facility connecting each of the individual users to the local telephone network before the lines are routed through the conventional local telephone network equipment. It is preferable to have access to these lines prior to the splitter and modem technology offered by the local service providers. By having access to the twisted-pair wires entering the customer's premises, interexchange companies can differentiate their services by providing higher bandwidth, improving the capabilities of the customer premises equipment, and lowering overall system costs to the customer by providing competitive service alternatives.

The new architecture may utilize a video phone and/or other devices to provide new services to an end user; an intelligent services director (ISD) disposed near the customer's premises for multiplexing and coordinating many digital services onto a single twisted-pair line; a facilities management platform (FW) disposed in the local telephone network's central office for routing data to an appropriate interexchange company network; and a network server platform (NSP) coupled to the FMP for providing new and innovative services to the customer and for distinguishing services provided by the interexchange companies from those services provided by the local telephone network.

As part of this system, one aspect of the invention provides a network server platform forming part of a new local loop network architecture designed to overcome the limitations of current art local access loop technologies. This invention allows end users to seamlessly connect to the numerous disparate networks in order to access the multiplicity of services that these networks have to offer. The network server platform allows interconnection between networks with varying networking protocols.

The network server platform is a key component of the new architecture and interacts to allow for easy and seamless integration with network components on both the local access level as well as the core network. The network server platform offers external networking capabilities to the local access network. As a result, the local access network terminates on the network server platform. The network server platform provides subscribers or end users the capabilities to access services from a multiplicity of disparate networks offering a variety of services.

BRIEF DESCRIPTION OF THE DRAWINGS

The foregoing summary of the invention, as well as the following detailed description of preferred embodiments, is better understood when read in conjunction with the accompanying drawings, which are included by way of example, and not by way of limitation with regard to the claimed invention.

FIG. 27 illustrates a diagram of the systems and services architecture for directory services employing network server platform hosting;

FIG. 28 illustrates a diagram of the systems and services architecture for video delivery services employing network server platform hosting; and FIG. 29 illustrates a diagram of the systems and services architecture for information pushing services and information auto-delivery services.

DETAILED DESCRIPTION OF PREFERRED EMBODIMENTS

Figure 1:
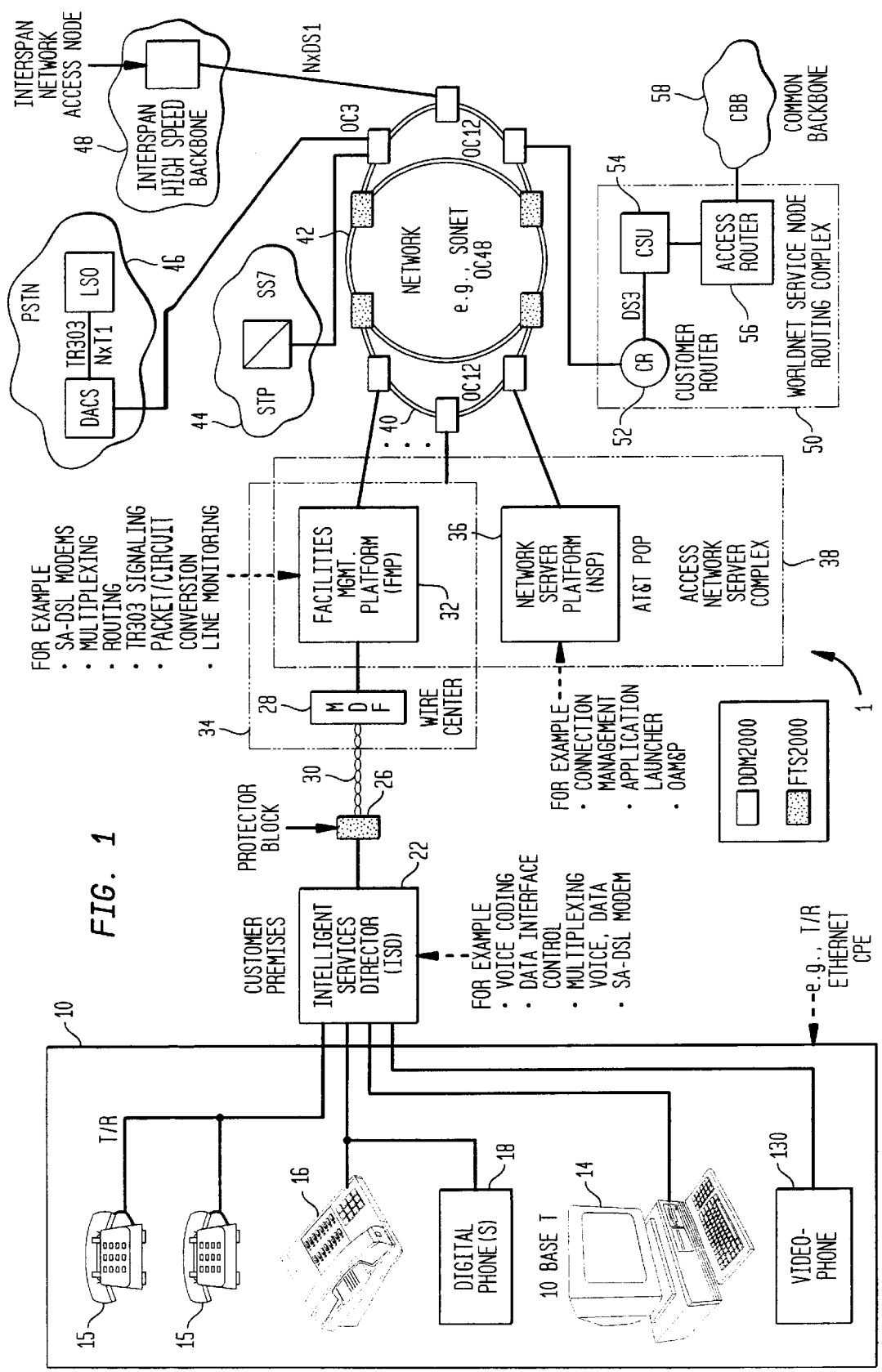
FIG. 1 illustrates an embodiment of a hybrid fiber twisted pair local loop architecture.

The following applications, filed concurrently herewith, are hereby incorporated by reference:

1. A Hybrid Fiber Twisted-pair Local Loop Network Service Architecture (U.S. Application Ser. No. 09/001,360, filed Dec. 31, 1997);
2. Dynamic Bandwidth Allocation for use in the Hybrid Fiber Twisted-pair Local Loop Network Service Architecture (U.S. application Ser. No. 09/001,225, filed Dec. 31, 1997);
3. The VideoPhone (U.S. application Ser. No. 09/001,905, filed Dec. 31, 1997);
4. VideoPhone Privacy Activator (U.S. patent application Ser. No. 09/001,909, filed Dec. 31, 1997);
5. VideoPhone Form Factor (U.S. patent application Ser. No. 09/001,583, filed Dec. 31, 1997);
6. VideoPhone Centrally Controlled User Interface With User Selectable Options (U.S. patent application Ser. No. 09/001,908, filed Dec. 31, 1997);
7. VideoPhone User Interface Having Multiple Menu Hierarchies (U.S. patent application Ser. No. 09/001,353, filed Dec. 31, 1997);
8. VideoPhone Blocker (U.S. patent application Ser. No. 09/001,353, filed Dec. 31, 1997);
9. VideoPhone Inter-com For Extension Phones (U.S. patent application Ser. No. 09/001,358, filed Dec. 31, 1997);
10. Advertising Screen Saver (U.S. patent application Ser. No. 09/001,572, filed Dec. 31, 1997);
11. Information Display for a Visual Communication Device (U.S. patent application Ser. No. 09/001,906,filed Dec. 31, 1997)
12. VideoPhone Multimedia Announcement Answering Machine (U.S. patent application Ser. No. 09/001,911, filed Dec. 31, 1997);
13. VideoPhone Multimedia Announcement Message Toolkit (U.S. patent application Ser. No. 09/001,345, filed Dec. 31, 1997);
14. VideoPhone Multimedia Video Message Reception (U.S. patent application Ser. No. 09/001,362, filed Dec. 31, 1997);
15. VideoPhone Multimedia Interactive Corporate Menu Answering Machine Announcement (U.S. patent application Ser. No. 09/001,575, filed Dec. 31, 1997);
16. VideoPhone Multimedia Interactive On-Hold Information Menus (U.S. patent application Ser. No. 09/001,307, filed Dec. 31, 1997);
17. VideoPhone Advertisement When Calling Video Non-enabled VideoPhone Users (U.S. patent application Ser. No. 09/001,361, filed Dec. 31, 1997);
18. Motion Detection Advertising (U.S. patent application Ser. No. 09/001,355, filed Dec. 31, 1997);
19. Interactive Commercials (U.S. patent application Ser. No. 09/001,758, filed Dec. 31, 1997);

20. VideoPhone Electronic Catalogue Service (U.S. patent application Ser. No. 09/001,421, filed Dec. 31, 1997);
21. A Multifunction Interface Facility connecting Wideband Multiple Access Subscriber Loops With Various Networks (U.S. patent application Ser. No. 09/001,422, filed Dec. 31, 1997);
22.
23. Life Line Support for Multiple Service Access on Single Twisted-pair (U.S. patent application Ser. No. 09/001,343, filed Dec. 31, 1997);
24. A Network Server Platform for a Hybrid Fiber Twisted Pair Local Loop Network Service Architecture (U.S. patent application Ser. No. 09/001,582, filed Dec. 31, 1997)
25. A Communication Server Apparatus For Interactive Commercial Service (U.S. patent application Ser. No. 09/001,344, filed Dec. 31, 1997);
26. NSP Based Multicast Digital Program Delivery Service (U.S. patent application Ser. No. 09/001,580, filed Dec. 31, 1997);
27. NSP Internet, JAVA Server and VideoPhone Application Server (U.S. patent application Ser. No. 09/001,354, filed Dec. 31, 1997);
28. NSP WAN Interconnectivity Services for Corporate Telecommuters (U.S. patent application Ser. No. 09/001,540, filed Dec. 31, 1997);
29. NSP Telephone Directory White-Yellow Page Services (U.S. patent application Ser. No. 09/001,426, filed Dec. 31, 1997);
30. NSP Integrated Billing System For NSP services and Telephone services (U.S. patent application Ser. No. 09/001,359, filed Dec. 31, 1997);
31. Network Server Platform/Facility Management Platform Caching Server (U.S. patent application Ser. No. 09/001,418, filed Dec. 31, 1997);
32. An Integrated Services Director (ISD) Overall Architecture (U.S. patent application Ser. No. 09/001,417, filed Dec. 31, 1997);
33. ISD and VideoPhone (Customer Premises) Local House Network (U.S. patent application Ser. No. 09/001,418, filed Dec. 31, 1997);
34. ISD Wireless Network (U.S. patent application Ser. No. 09/001,363, filed Dec. 31, 1997);
35. ISD Controlled Set-Top Box (U.S. patent application Ser. No. 09/001,424, filed Dec. 31, 1997);
36. Integrated Remote Control and Phone (U.S. patent application Ser. No. 09/001,423, filed Dec. 31, 1997);
37. Integrated Remote Control and Phone User Interface (U.S. patent application Ser. No. 09/001,420, filed Dec. 31, 1997);
38. Integrated Remote Control and Phone Form Factor (U.S. patent application Ser. No. 09/001,910, filed Dec. 31, 1997);
39. VideoPhone Mail Machine (Ser. No. 60/070,124);
40. Restaurant Ordering Via VideoPhone (Ser. No. 60/070,121);
41. Ticket Ordering Via VideoPhone (Ser. No. 60/070,103);
42. Multi-Channel Parallel/Serial Concatenated Convolutional Codes And Trellis Coded Modulation Encode/Decoder (U.S. patent application Ser. No. 09/001,342, filed Dec. 31, 1997);
43. Spread Spectrum Bit Allocation Algorithm (U.S. patent application Ser. No. 09/001,842, filed Dec. 31, 1997);
44. Digital Channelizer With Arbitrary Output Frequency (U.S. patent application Ser. No. 09/001,581, filed Dec. 31, 1997);
45. Method And Apparatus For Allocating Data Via Discrete Multiple Tones (U.S. patent application Ser. No. 08/997,467, filed Dec. 31, 1997);
46. Method And Apparatus For Reducing Near-End Cross Talk In Discrete Multi-Tone Modulators/Demodulators (filed Dec. 12, 1997, U.S. patent application Ser. No. 08/997,176, filed Dec. 31, 1997).

The present application is number 24 on this list.

In addition, the following two patent applications are incorporated by reference:

1. U.S. patent application Ser. No. 08/943,312 filed Oct. 14, 1997 entitled Wideband Communication System for the Home, to Robert R. Miller, II and Jesse E. Russell, and
2. U.S. patent application Ser. No. 08/858,170, filed May 14, 1997, entitled Wide Band Transmission Through Wire, to Robert R. Miller, II, Jesse E. Russell and Richard R. Shively.

Referring to FIG. 1, a first exemplary communication network architecture employing a hybrid fiber, twisted-pair (HFTP) local loop 1 architecture is shown. An intelligent services director (ISD) 22 may be coupled to a central office 34 via a twisted-pair wire, hybrid fiber interconnection, wireless and/or other customer connection 30, a connector block 26, and/or a main distribution frame (MDF) 28. The ISD 22 and the central or local office 34 may communicate with each other using, for example, framed, time division, frequency-division, synchronous, asynchronous and/or spread spectrum formats, but in exemplary embodiments uses DSL modem technology. The central office 34 preferably includes a facilities management platform (FMP) 32 for processing data exchanged across the customer connection 30. The FMP 32 may be configured to separate the plain old telephone service (POTS) from the remainder of the data on the customer connection 30 using, for example, a tethered virtual radio channel (TVRC) modem (shown in FIG. 4A). The remaining data may be output to a high speed backbone network (e.g., a fiber-optic network) such as an asynchronous transfer mode (ATM) switching network. The analog POTS data may be output directly to a public switch telephone network (PSTN) 46, and/or it may be digitized, routed through the high speed backbone network, and then output to the PSTN 46.

The FMP 32 may process data and/or analog/digitized voice between customer premise equipment (CPE) 10 and any number of networks. For example, the FMP 32 may be interconnected with a synchronous optical network (SONET) 42 for interconnection to any number of additional networks such as an InterSpan backbone 48, the PSTN 46, a public switch switching network (e.g. call setup SS7-type network 44), and/or a network server platform (NSP) 36. Alternatively, the FMP 32 may be directly connected to any of these networks. One or more FMPs 32 may be connected directly to the high speed backbone network (e.g., direct fiber connection with the SONET network 42) or they may be linked via a trunk line (e.g., trunks 40 or 42) to one or more additional networks.

The NSP 36 may provide a massive cache storage for various information that may be provided across the SONET net 42 to the FMP 32 and out to the ISD 22. The NSP 36 and the FMP 32 may collectively define an access network server complex 38. The NSP 36 may be interconnected with multiple FMPs 32. Furthermore, each FMP 32 may interconnect with one or more ISDs 22. The NSP 36 may be located anywhere but is preferably located in a point-of-presence (POP) facility. The NSP 36 may further act as a gateway to, for example, any number of additional services.

The ISD 22 may be interconnected to various devices such as a videophone 130, other digital phones 18, set-top devices, computers, and/or other devices comprising the customer premise equipment 10. The customer premise equipment may individually or collectively serve as a local network computer at the customer site. Application applets may be downloaded from the NSP 36 into some or all of the individual devices within the customer premise equipment 10. Where applets are provided by the NSP 36, the programming of the applets may be updated such that the applets are continually configured to the latest software version by the interexchange carrier. In this way, the CPE 10 may be kept up to date by simply re-loading updated applets. In addition, certain applets may be resident on any of the CPE 10. These resident applets may be periodically reinitialized by simply sending a request from, for example, a digital phone 18 and/or a videophone 130 to the FMP 32 and thereafter to the NSP 36 for reinitialization and downloading of new applets. To ensure widespread availability of the new features made possible by the present architecture, the customer premise equipment may be provided to end users either at a subsidized cost or given away for free, with the cost of the equipment being amortized over the services sold to the user through the equipment. Additionally, the service provider may collect fees from advertisers to subsidize the cost of the equipment.

Figure 2:
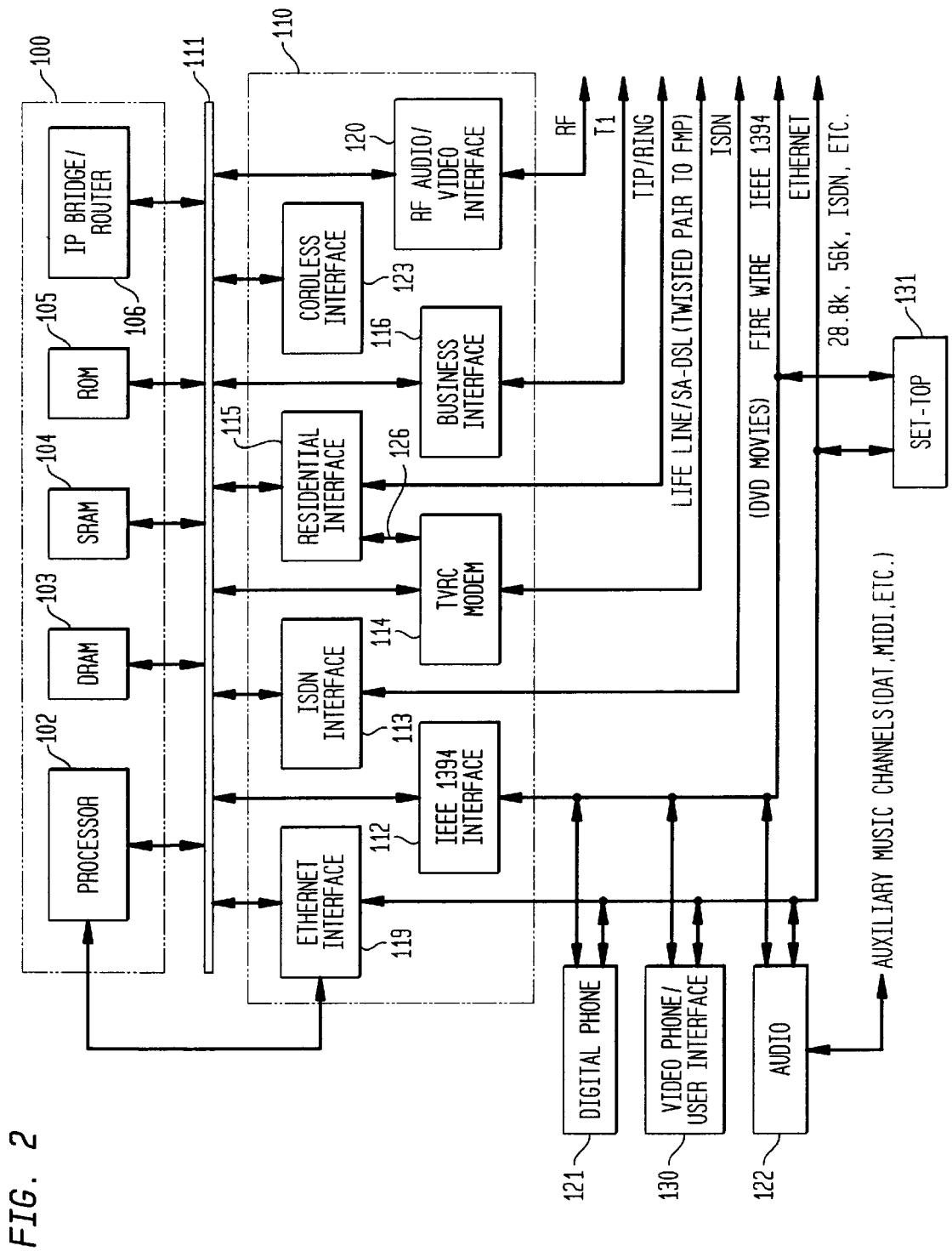
FIG. 2 is a block diagram of an embodiment of an intelligent services director consistent with the architecture shown in FIG. 1.

Referring to FIG. 2, the ISD 22 may connect with a variety of devices including analog and digital voice telephones 15, 18; digital videophones 130, devices for monitoring home security, meter reading devices (not shown), utilities devices/energy management facilities (not shown), facsimile devices 16, personal computers 14, and/or other digital or analog devices. Some or all of these devices may be connected with the ISD 22 via any suitable mechanism such as a single and/or multiple twisted-pair wires, fiber, and/or a wireless connection. For example, a number of digital devices may be multi-dropped on a single twisted-pair connection. Similarly, analog phones and other analog devices may be multi-dropped using conventional techniques.

The ISD 22 may be located within the home/business or mounted exterior to the home/business. The ISD 22 may operate from electrical power supplied by the local or central office 34 and/or from the customer's power supplied by the customer's power company. Where the ISD 22 includes a modem, it may be desirable to power the ISD 22 with supplemental power from the home in order to provide sufficient power to enable the optimal operation of the modem.

As shown in FIG. 2, in some embodiments the ISD 22 may include a controller 100 which may have any of a variety of elements such as a central processing unit 102, a DRAM 103, an SRAM 104, a ROM 105 and/or an Internet protocol (IP) bridge router 106 connecting the controller 100 to a system bus 111. The system bus 111 may be connected with a variety of network interface devices 110. The network interface devices 110 may be variously configured to include an integrated services digital network (ISDN) interface 113, an Ethernet interface 119 for example, 28.8 kbps data, 56 kpbs data, or ISDN or any other suitable bit rate service, an IEEE 1394 "fire wire" interface 112 (e.g., for a digital videodisc device (DVD)), a digital subscriber line (DSL) modem (e.g., for a digital subscriber line (DSL) modem), a residential interface 114, (e.g., standard POTS phone systems such as tip ring), a business interface 116 (e.g., a T1 line and/or PABX interface), a radio frequency (RF) audio/video interface 120 (e.g., a cable television connection), and a cordless phone interface 123 (e.g., a 900 MHZ transceiver). Connected to one of the network interfaces and/or the system bus 111 may be any number of devices such as an audio interface 122 (e.g., for digital audio, digital telephones, digital audio tape (DAT) recorders/players, music for restaurants, MIDI interface, DVD, etc.), a digital phone 121, a videophone/user interface 130, a television set-top device 131 and/or other devices. Where the network interface is utilized, it may be desirable to use, for example, the IEEE 1394 interface 112 and/or the Ethernet interface 119.

A lifeline 126 may be provided for continuous telephone service in the event of a power failure at the CPE 10. The lifeline 126 may be utilized to connect the ISD 22 to the local telecommunications company's central office 34 and, in particular, to the FMP 32 located in the central office 34.

The ISD may be variously configured to provide any number of suitable services. For example, the ISD 22 may offer high fidelity radio channels by allowing the user to select a particular channel and obtaining a digitized radio channel from a remote location and outputting the digital audio, for example, on audio interface 122, video phone 130, and/or digital phones 121. A digital telephone may be connected to the audio interface 122 such that a user may select any one of a number of digital audio service channels by simply having the user push a digital audio service channel button on the telephone and have the speaker phone output particular channels. The telephone may be preprogramed to provide the digital audio channels at a particular time, such as a wake up call for bedroom mounted telephone, or elsewhere in the house. The user may select any number of services on the video phone and/or other user interface such as a cable set-top device. These services may include any number of suitable services such as weather, headlines in the news, stock quotes, neighborhood community services information, ticket information, restaurant information, service directories (e.g., yellow pages), call conferencing, billing systems, mailing systems, coupons, advertisements, maps, classes, Internet, pay-per-view (PPV), and/or other services using any suitable user interface such as the audio interface 122, the video phone/user interface 130, digital phones, 121 and/or another suitable device such as a set top device 131.

In further embodiments, the ISD 22 may be configured as an IP proxy server such that each of the devices connected to the server utilizes transmission control protocol/Internet protocol (TCP/IP) protocol. This configuration allows any device associated with the ISD to access the Internet via an IP connection through the FMP 32. Where the ISD 22 is configured as an IP proxy server, it may accommodate additional devices that do not support the TCP/IP protocol. In this embodiment, the ISD 22 may have a proprietary or conventional interface connecting the ISD 22 to any associated device such as to the set top box 131, the personal computer 14, the video telephone 130, the digital telephone 18, and/or some other end user device.

In still further embodiments, the ISD 22 may be compatible with multicast broadcast services where multicast information is broadcast by a central location and/or other server on one of the networks connected to the FMP 32, e.g., an ATM-switched network. The ISD 22 may download the multicast information via the FMP 32 to any of the devices connected to the ISD 22. The ISD 22 and/or CPE 10 devices may selectively filter the information in accordance with a specific customer user's preferences. For example, one user may select all country music broadcasts on a particular day while another user may select financial information. The ISD 22 and/or any of the CPE 10 devices may also be programmed to store information representing users' preferences and/or the received uni-cast or multicast information in memory or other storage media for later replay. Thus, for example, video clips or movies may be multicast to all customers in the community with certain users being preconfigured to select the desired video clip/ movie in real time for immediate viewing and/or into storage for later viewing.

Figure 3A:
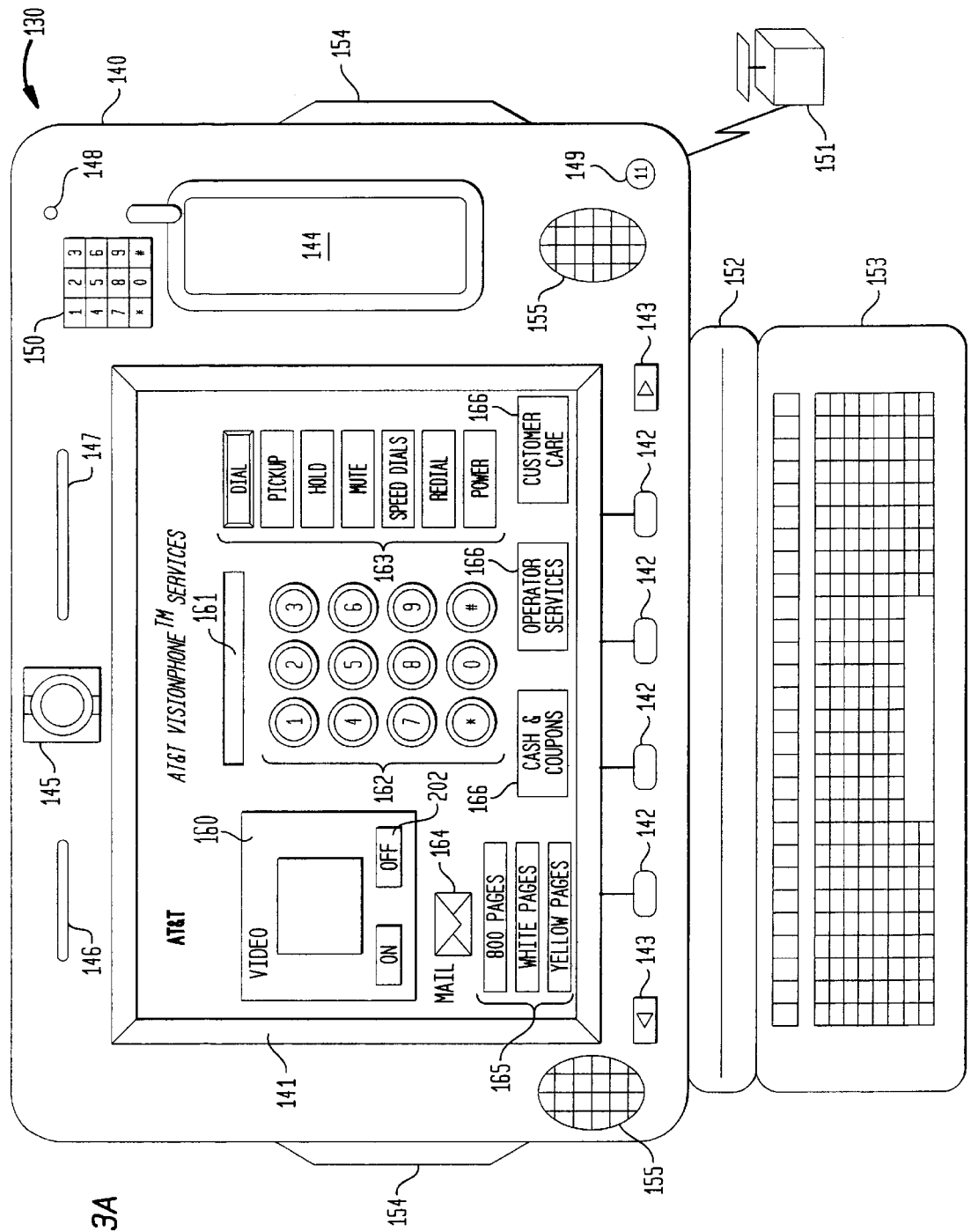
FIGS. 3A and 3B illustrate an embodiment of a video phone consistent with the architecture shown in FIG. 1.
Figure 3B:
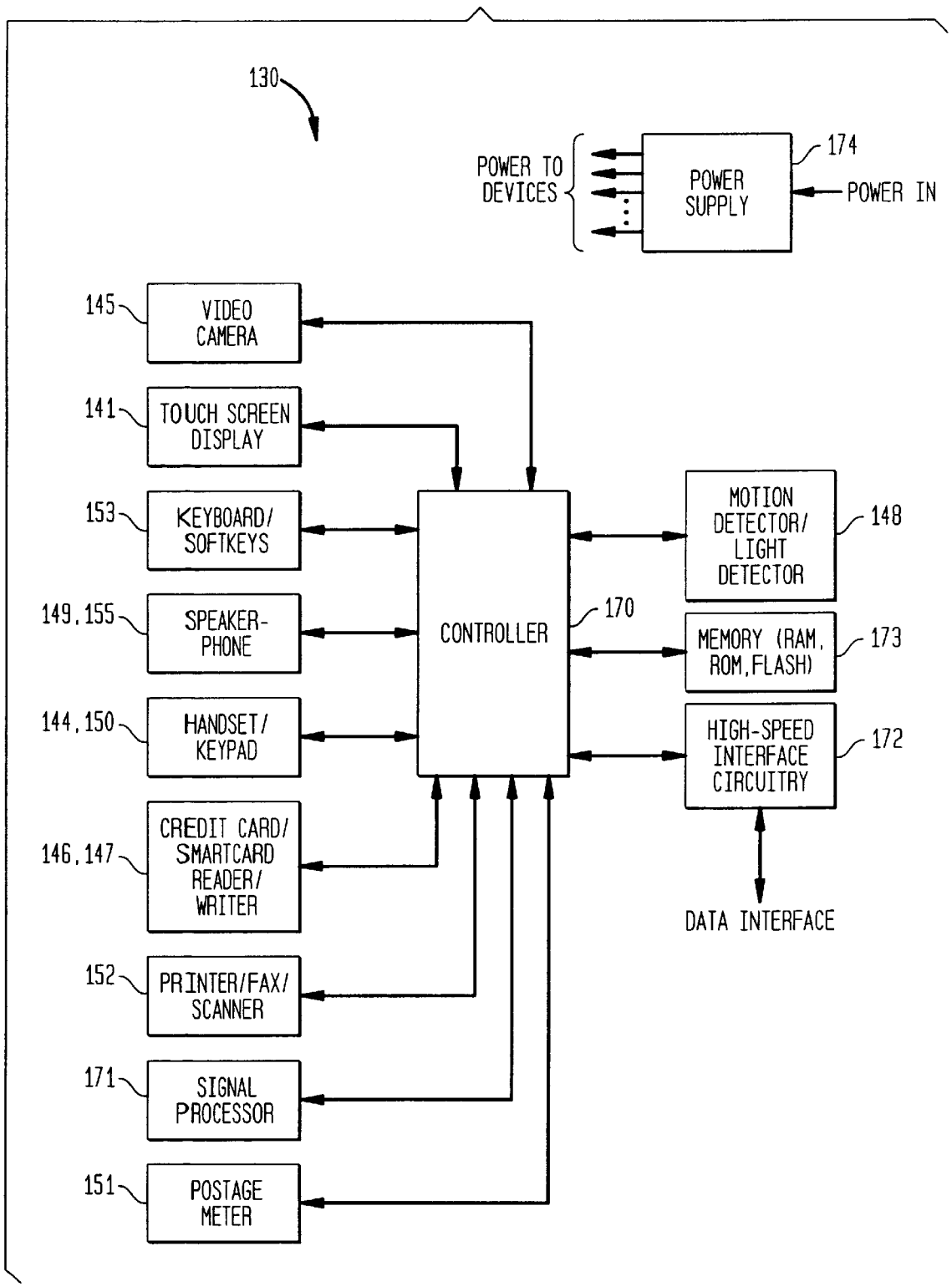

Referring to FIG. 3A, a videophone 130 may include a touch screen display 141 and soft keys 142 around the perimeter of the display 141. The display may be responsive to touch, pressure, and/or light input. Some or all of the soft keys 142 may be programmable and may vary in function depending upon, for example, the applet being run by the videophone 130. The function of each soft key may be displayed next to the key on the display 141. The functions of the soft keys 142 may also be manually changed by the user by pressing scroll buttons 143. The videophone 140 may also include a handset 144 (which may be connected via a cord or wireless connection to the rest of the videophone and/or directly to the ISD), a keypad 150, a video camera 145, a credit card reader 146, a smart card slot 147, a microphone 149, a motion and/or light detector 148, built-in speaker(s) 155, a printer/scanner/facsimile 152, and/or external speakers 154 (e.g., stereo speakers). A keyboard 153 and/or a postage scale 151 may also be connected to the videophone 130. Any or all of the above-mentioned items may be integrated with the videophone unit itself or may be physically separate from the videophone unit. A block diagram of the video phone unit is shown in FIG. 3B. Referring to FIG. 3B, in addition to the items above, the video phone 130 may also include a signal processor 171, high speed interface circuitry 172, memory 173, power supply 174, all interconnected via a controller 170.

When the videophone 130 is used as a video telephone, the display 141 may include one or more video window(s) 160 for viewing a person to whom a user is speaking and/or showing the picture seen by the person on the other end of the video phone. The display may also include a dialed-telephone-number window 161 for displaying the phone number dialed, a virtual keypad 162, virtual buttons 163 for performing various telephone functions, service directory icons 165, a mail icon 164, and/or various other service icons 166 which may be used, for example, for obtaining coupons or connecting with an operator. Any or all of these items may be displayed as virtual buttons and/or graphic icons and may be arranged in any combination. Additionally, any number of other display features may be shown on the video phone in accordance with one or more of the applications incorporated by reference below.

Figure 4A:
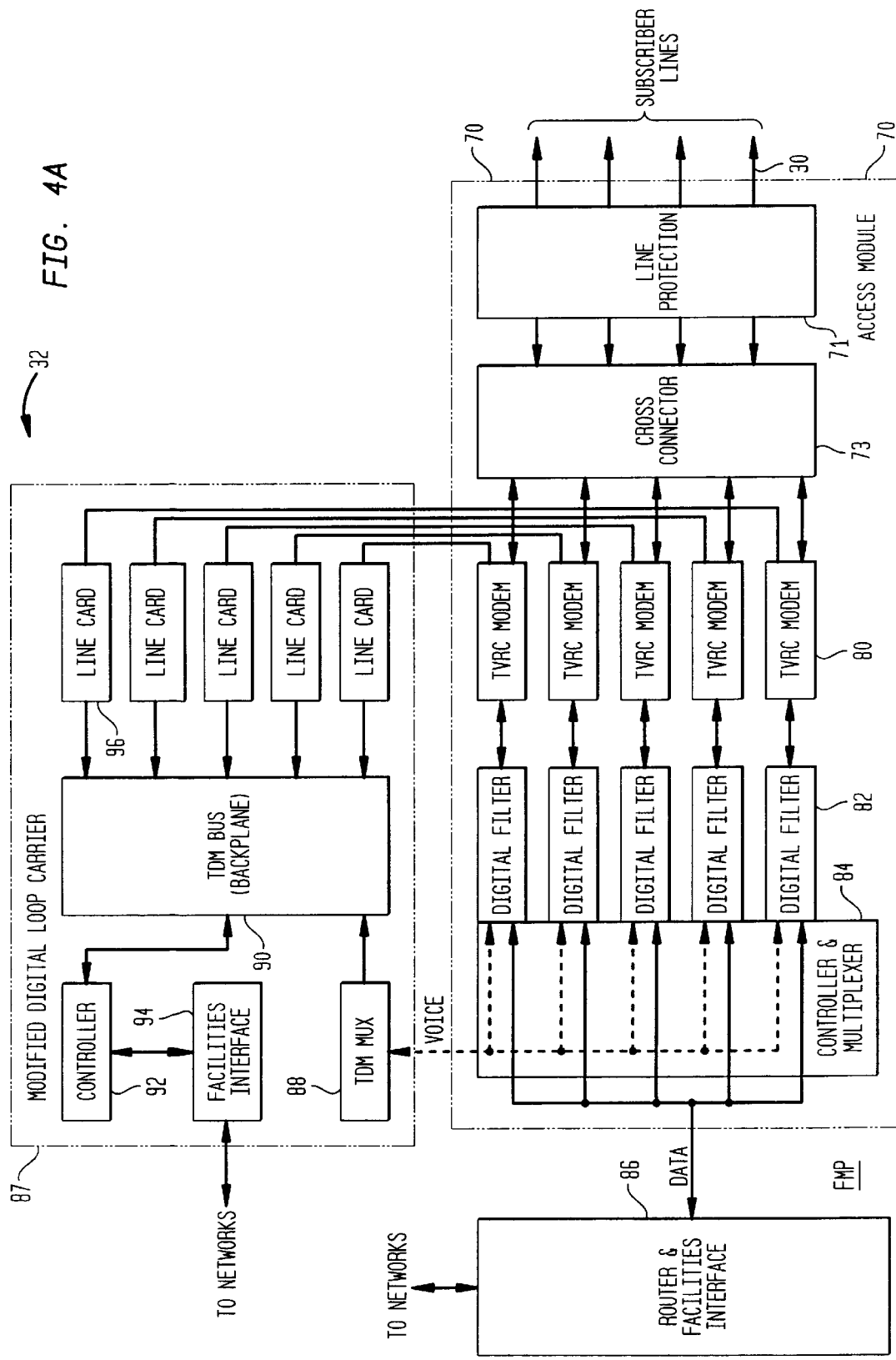
FIG. 4A is a block diagram of an embodiment of a facilities management platform consistent with the architecture shown in FIG. 1.

Referring to FIG. 4A, the FMP 32 may coordinate the flow of data packets, separate voice signals from other signals, perform line monitoring and switching functions, and/or convert between analog and digital signals. The FMP 32 may process data sent from the CPE 10 to the central or local office 34 by separating and reconstructing analog voice signals, data, and control frames. The FMP 32 may process data sent from the central or local office 34 to the CPE 10 by separating control messages from user information, and configure this information into segments that for transport across the digital subscriber loop. The FMP 32 may also terminate the link layer associated with the digital subscriber loop.

In some embodiments, the FMP 32 may include an access module 70 and a digital loop carrier 87. The access module 70 may include a line protector 71, a cross-connector 73, a plurality of TVRC modems 80, a plurality of digital filters 82, a controller multiplexer 84, and/or a router and facilities interface 86. The digital loop carrier 87 may include a plurality of line cards 96, a time domain multiplexing (TDM) multiplexor (MUX) 88, a TDM bus 90, a controller 92, and/or a facilities interface 94.

During normal operations, digital signals on the customer connection 30 (e.g., twisted-pair lines) containing both voice and data may be received by the TVRC modems 80 via the line protector 71 and the cross-connector 73. Preferably, the line protector 71 includes lightning blocks for grounding power surges due to lightning or other stray voltage surges. The TVRC modems 80 may send the digital voice and/or data signals to the controller multiplexor 84 and the digital filters 82. The digital filters 82 may separate the voice signals from the digital data signals, and the controller multiplexor 84 may then multiplex the voice signals and/or data signals received from the digital filters 82. The controller multiplexor 84 may then send multiplexed voice signals to the TDM MUX 88 and the data signals to the router and facilities interface 86 for transmission to one or more external networks. The TDM MUX 88 may multiplex the voice signals from the controller multiplexor 84 and/or send the voice signals to the TDM bus 90, which may then send the digital voice signals to the controller 92 and then to the facilities interface 94 for transmission to one or more external networks. Both the router and facilities interface 86 and the facilities interface 94 may convert between electrical signals and optical signals when a fiber optic link is utilized.

When there is a failure of the digital data link (e.g., if there is a failure of the TVRC modems 80 at the FMP 32 or the TVRC modem 114 at the ISD 22), only analog voice signals might be sent over the subscriber lines 30. In such a case, the analog voice signals may be directly routed to the line cards 96, bypassing the TVRC modems 80, the digital filters 82, the controller multiplexor 84, and the TDM MUX 88. Thus, voice communication is ensured despite a failure of the digital data link. The line cards 96 may convert the analog voice signals into digital format (e.g., TDM format) and send the digitized voice data onto the TDM bus 90 and eventually through the controller 92 and the facilities interface 94 for transmission to one or more external networks.

Figure 4B:
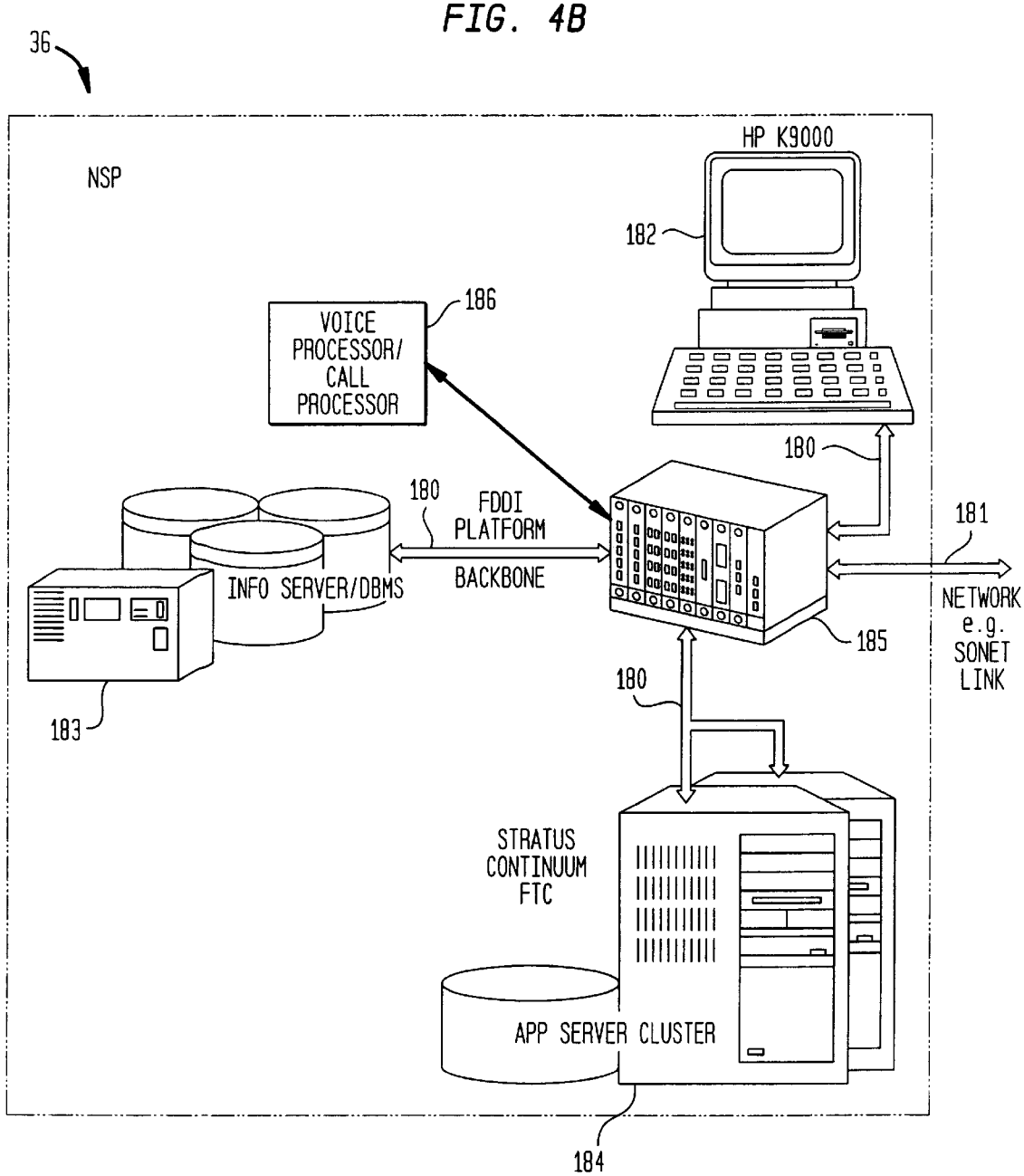
FIG. 4B illustrates a block diagram of an embodiment of a network server platform consistent with the architecture shown in FIG. 1.

Referring to FIG. 4B, the NSP 36 may be variously configured to provide any number of services provided by a server such as information services, Internet services, pay-per-view movie services, data-base services, commercial services, and/or other suitable services. In the embodiment shown in FIG. 4B, the NSP 36 includes a router 185 having a backbone 180 (e.g., a fiber distributed data interface (FDDI) backbone) that interconnects a management server 182, an information/database server 183, and/or one or more application server clusters 184. The NSP 36 may be connected via the router 185 by a link 181 to one or more external networks, NSPs 36, and/or an FMPs 32. The information/data base server 183 may perform storage and/ or database functions. The application server cluster 184 may maintain and control the downloading of applets to the ISD 22. The NSP 36 may also include a voice/call processor 186 configured to handle call and data routing functions, set-up functions, distributed operating system functions, voice recognition functions for spoken commands input from any of the ISD connected devices as well as other functions.

Implementation of this new architecture allows for differentiation of local service, will provide new revenue streams from value-added services, and have the potential to significantly reduce operational costs. The architecture is constructed such that additional performance benefits from the existing loop plant are extracted and maximizes use of the existing infrastructure and current systems.

The new architecture implements active services where the user triggers a stimulus by touch, voice or a combination of touch and voice commands to obtain a network based response to expand traditional services as well as provide entirely new services. These responses and the associated services include call connection, information delivery, trigger network response, and performance transactions.

Call connection services provide for calls to be initiated by touching icons corresponding to the called party. It also enables self scheduling of conference calls without the need for an operator as well as initiation of interactive calls with white board augmentation. Class services can likewise be invoked via icons and prompts in a natural manner without requiring memorization of numerical codes.

Information delivery services provide for a simple user interface that enables data base and search engine technology (formerly accessible only to networked computers) to be leveraged for telephony services. For example, access to regional, national or international electronic interaction with yellow and white page directories, navigation and access for voice, e-mail, and fax messages, review of AT&T bill for services, review of AT&T calling plans, review of CLASS and other service offerings. Thus certain marketing, operator services, billing, and customer care functions can be accessed by the customer without the need for an intermediate service representative, thus reducing operations cost while increasing customer convenience. The screen phone eliminates the need for an intermediary to call up information on a screen and read it to the customer and streamlines customer access to information.

The trigger network response provides a screen interface that enables the customer to obtain operator services without accessing a human operator, obtain credit for wrong numbers automatically, view rate tables, self provision an AT&T Calling Plan or other CLASS services, conduct conference calls, or define a user profile for pointcast on a "ticker tape" that scrolls desired information on the videophone screen.

Performance transactions allows users via the videophone and its associated card swiper to enable users to perform transactions with security protection. These transactions include paying regular bills with paperless transactions, perform electronic banking including obtaining smart card cash in the home without the need to visit a bank or an ATM machine, conduct E-commerce, purchase products advertised on television via a synchronized ordering screen. The electronic bill payment scheme not only benefits the user but allows the service provider to obtain additional revenue by allowing those companies to outsource bill payments to AT&T.

Passive services can also be offered so that active customer responses are not required. These include advertising, providing electronic coupons, personalized news delivery services, and access to community news such as school closings. Providing an advertising feed directly to the customer premises equipment provides a new and potentially very large business opportunity to the local access network provider. Advertising can be displayed on the screen phone, whenever the videophone is not in active use. User profiles maintained on the network would enable the advertisements to target customer interests, geographic location, demographics, or some other criteria.

Providing electronic coupons is another passive service opportunity. The electronic coupon can be displayed on the touch screen at appropriate times throughout the day (e.g., orange juice in the early morning) as "screen savers." By swiping their smart card customers can electronically collect such coupons and use them at the store without the inconvenience of cutting them out of newspapers, etc. At the same time AT&T participates in the coupon industry and has access to another revenue stream.

Delivery of personalized news leverages diverse content assists in the creation of user profiles. In addition, emergency broadcasts such as flash flood warnings, tornado, hurricane, etc., can be broadcast simultaneously while other transactions are being performed. This service could be offered as a public service.

The offering of interactive services include the combination of a graphics capable touch screen videophone, simultaneous voice and data capability, and a high speed data line to furnish a superior user interface than a traditional voice telephone and so enables a rich collection of new interactive services. These include multimedia enhanced voice calls, virtual PBX services, point and click conferencing, intelligent call management, access to the Internet, and a universal multimedia mailbox.

The multimedia enhances voice calls allows users to supplement voice calls with whiteboard graphics or text. The multimedia format can provide improved customer care, enhanced catalog ordering, interactive voice, and data response applications & info-on-demand, support for work-at-home, virtual PBX services, point-and-click conferencing, intelligent call management, Internet access, and a universal mail box.

Work-at-home provides the capabilities of tying into private, corporate Intranets for secure and reliable connectivity with an employer, client or customer. Virtual PBX services provide POPs for message/call alerting and graphical call management using a touch interface for call setup/bridging capabilities. Point-and-Click conferencing provides a graphical user interfaces to initiate POTS calls. Intelligent call management provides an easy, specified instructions to direct call management including providing a personal registry and mobile manager for wireless connectivity, call scheduling, "call me back," and personal assistant functions. The universal multimedia mailbox supports voice, text, audio, images integrated with a common interface.

Figure 5:
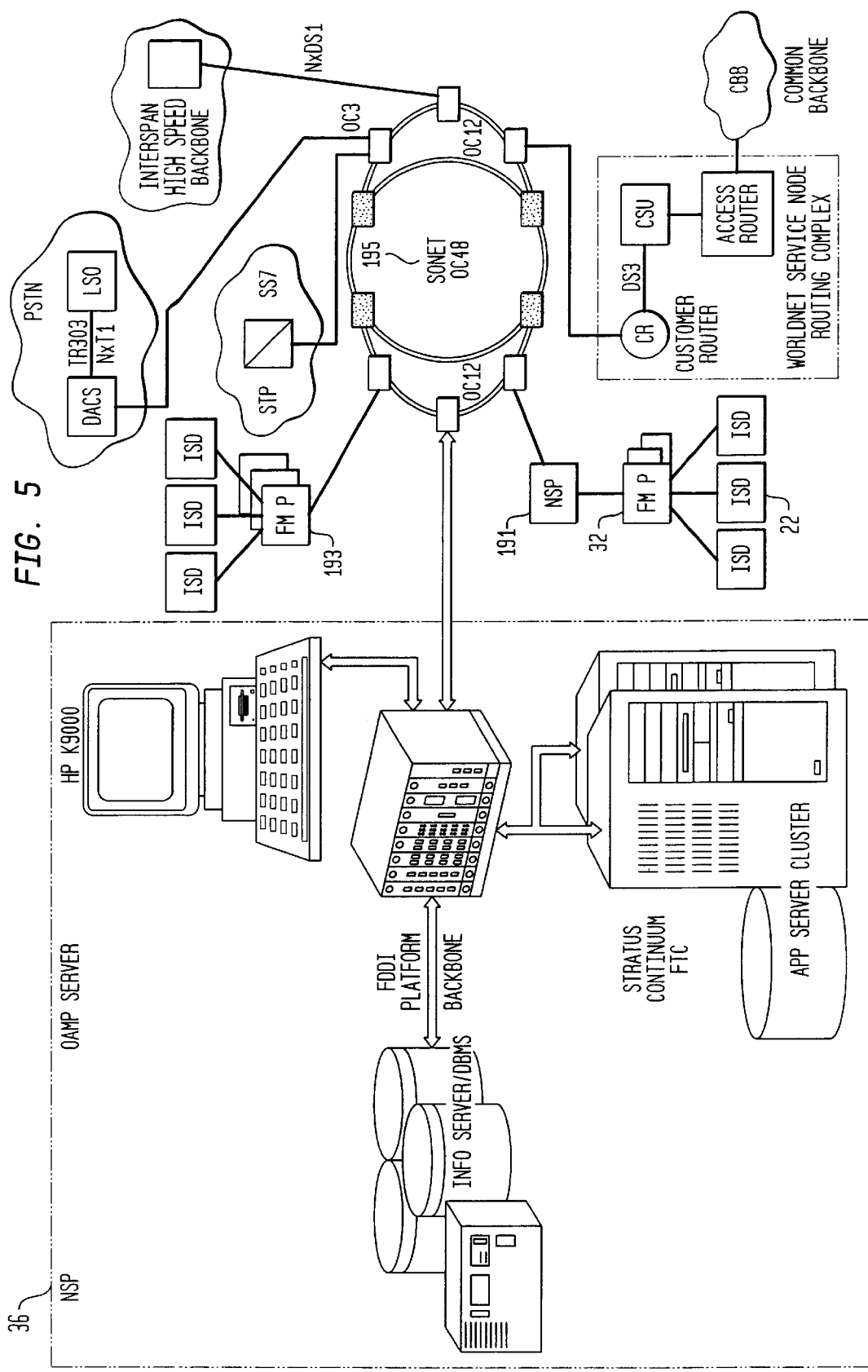
FIG. 5 illustrates a diagram of the network server platform internal architecture.

FIG. 5 illustrates a diagram of the network server platform internal architecture. The network server platform 36 is connected into the SONET trunks 40 and 42 via a fiber distributed data interface (FDDI) 202 with the Stratus Continuum FTC 204, the information server/DBMS 206 and the HP K9000 28. The Stratus Continuum FTC 204 is a large computer that manages the switching and networking tasks. The information server/DBMS 206 contains database information regarding signaling, switching, dialing plans, network configurations, customer information and called number information. The HP K9000 computer 208 manages the Stratus Continuum FTC and the information server/DBMS 206. The Stratus Continuum and HP K9000 computer types are merely descriptive of the type of computer that could be used to effectively operate the network server platform 36.

The NSP 36 is connected to a communications network illustrated by the SONET ring structure 195. Coupled to the SONET ring structure are other FMPs 193. In addition, NSP 36 is coupled to other NSPs such as NSP 191. This redundant interconnectivity provides a fault tolerant system and overall flexibility for coping with service interruption problems.

Figure 6:
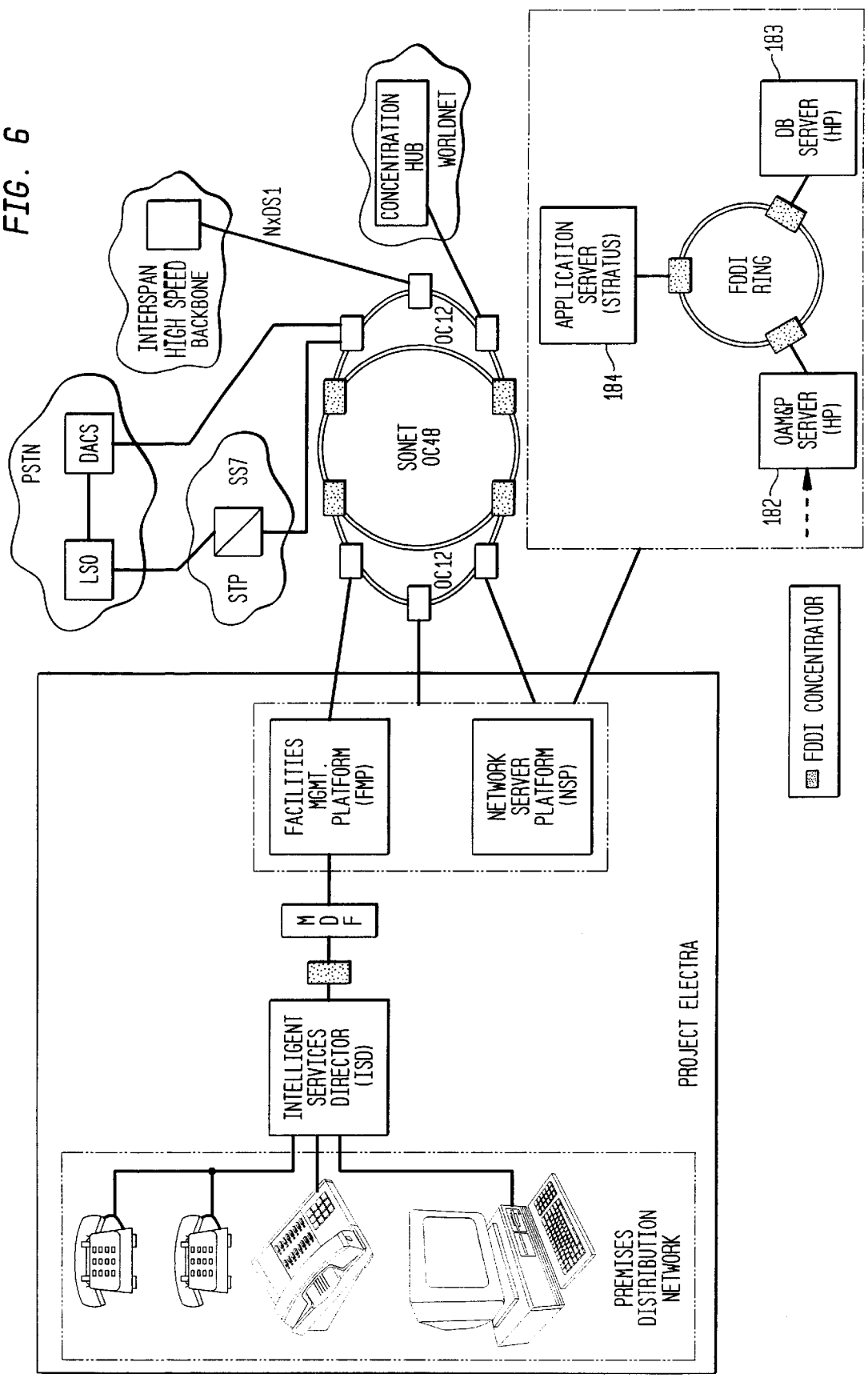
FIG. 6 illustrates a diagram of the network server platform.
Figure 7:
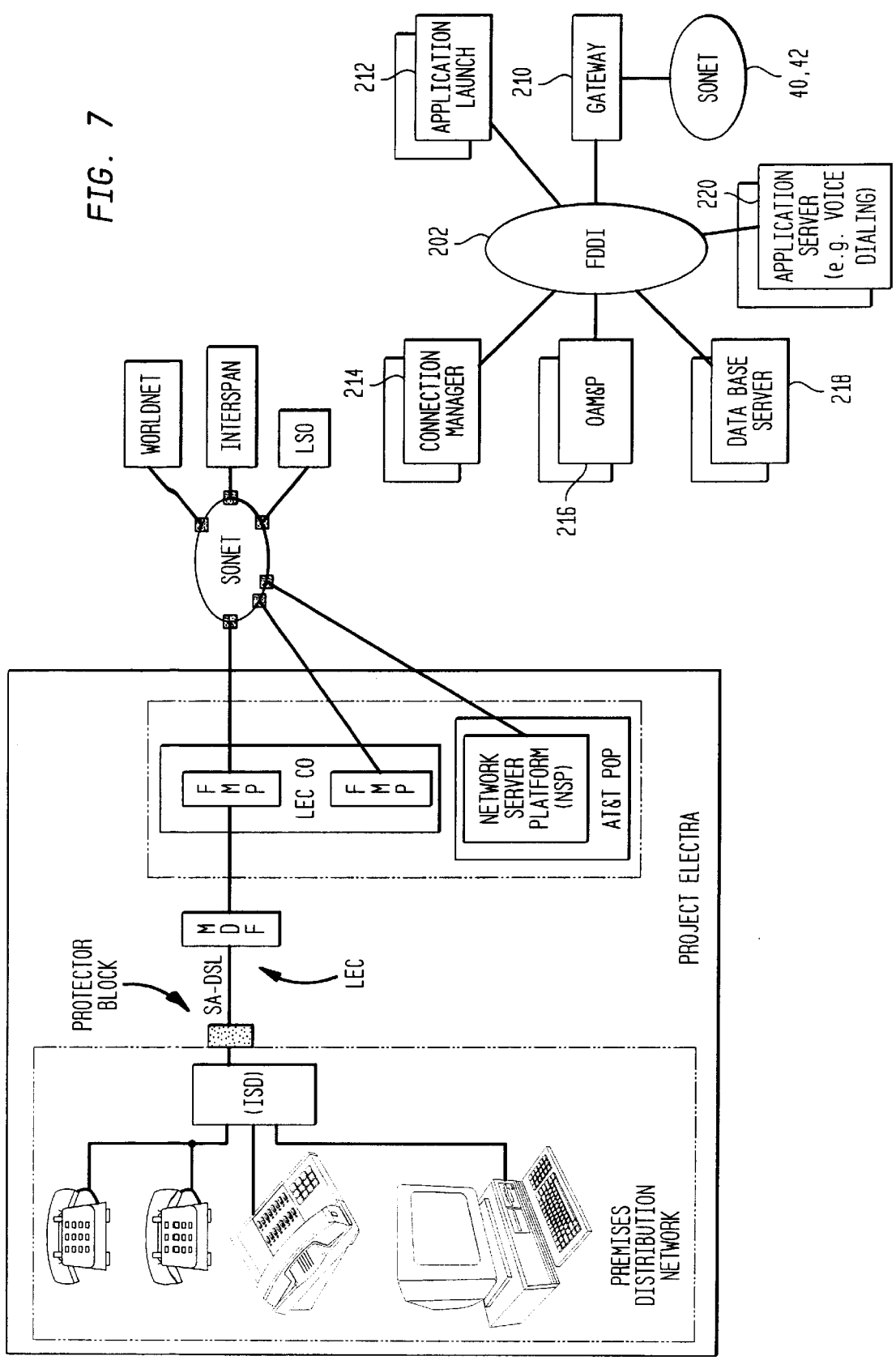
FIG. 7 illustrates a diagram of the network server platform building blocks.

FIG. 7 illustrates a block diagram of the NSP 36 consisting of devices and services used in the implementation of the new architecture. Connected to the SONET trunks 40 and 42 is a gateway 210. The gateway 210 might also function as the router 185 that was previously discussed. Located around the FDDI ring 202 are the management server 182, the information database server 183, and one or more application server clusters 184, as illustrated in FIG. 6.

The connection manager 214 initiates and terminates the placement of telephone calls, while managing the services and messaging. In a typical scenario, the connection manager 214 automates the calling process. This automation involves the executing of computer commands to search records in the database server 218 to ensure that the customer is a subscriber to the desired service or that the called number is a subscriber to the desired service. In addition, the connection manager 214 uses the operations, administration, maintenance, and provisioning 216 to track billing information. After the connection manager 214 obtains the required authorization, it launches the application 212 from the application server 220.

The OAM&P server 182 contains OAM&P management information 216 consisting of data relating to configuration, capacity, fault, order, traffic activity, design, security, surveillance and testing of the network. The information/database sever 183 contains specific customer information such as user profiles, authorization levels of service, provisioning and electronic commerce. The application server clusters 184 manage and track information regarding computer boot operations and initializations, call management, fault recognition and recovery, application binding, maintenance and design, application invoicing, craft interface enhancement, application downloads, translations, recent change and verify (RCV), authorizations and registrations, configurations and performance statistics.

Figure 8:
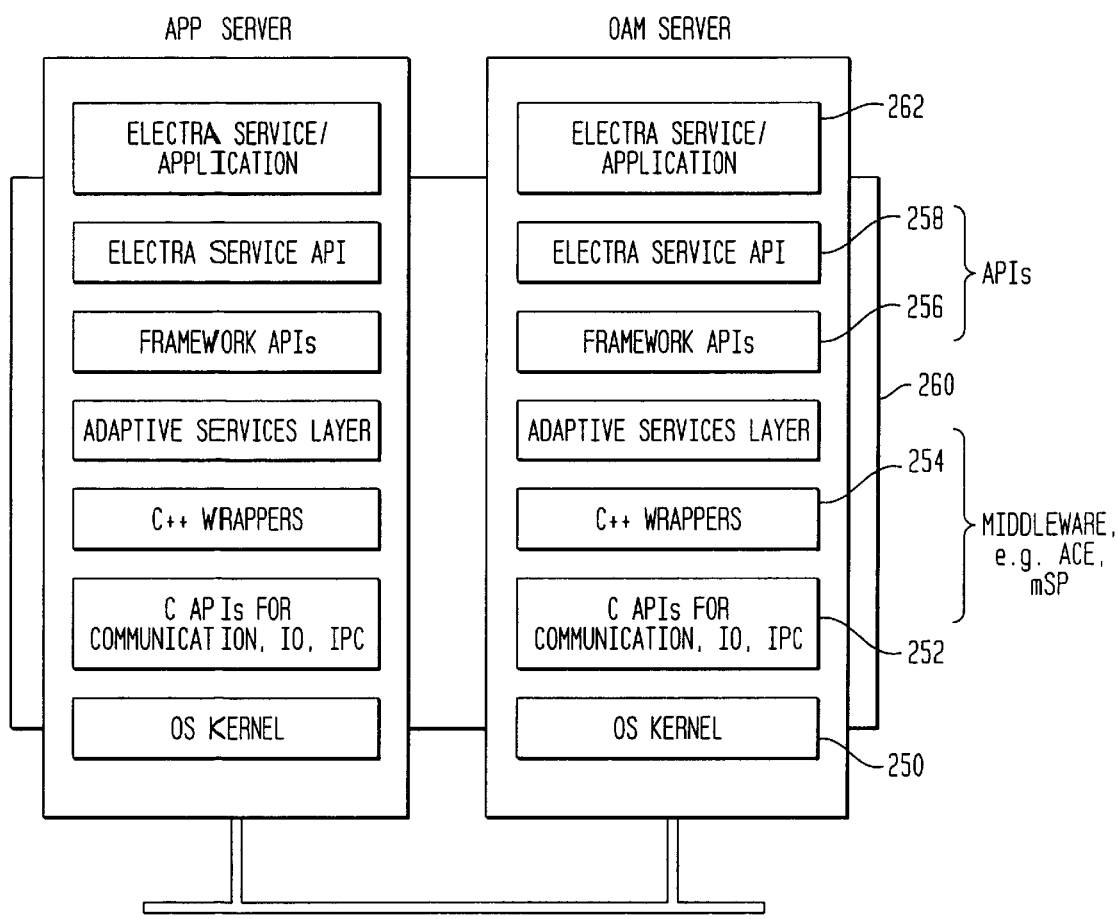
FIG. 8 illustrates a diagram of the network server platform software layer architecture.

FIG. 8 illustrates the software layer architecture for the application server 184 and the operation, administration and maintenance (OAM) server 182. In both the application server 184 and the OAM server 182, the software layer architecture is the same. The operating system kernel 250 contains a C application programable interface 252 for interfacing with communication, input/output and interprocess communication protocol (IPC). The data link, network, and transport layer contain middleware including the C applications 252, C++ wrappers 254 and the adaptive services layer 256. The C++ wrappers optimize the C library functions and the middleware puts intelligence into form object oriented programs in the transport layer to help applications route upwards and downwards in the protocol hierarchy. The session and transport layers contain service applications 260 and framework applications 258, respectively. The application layer contains the service/applications 262.

Figure 9:
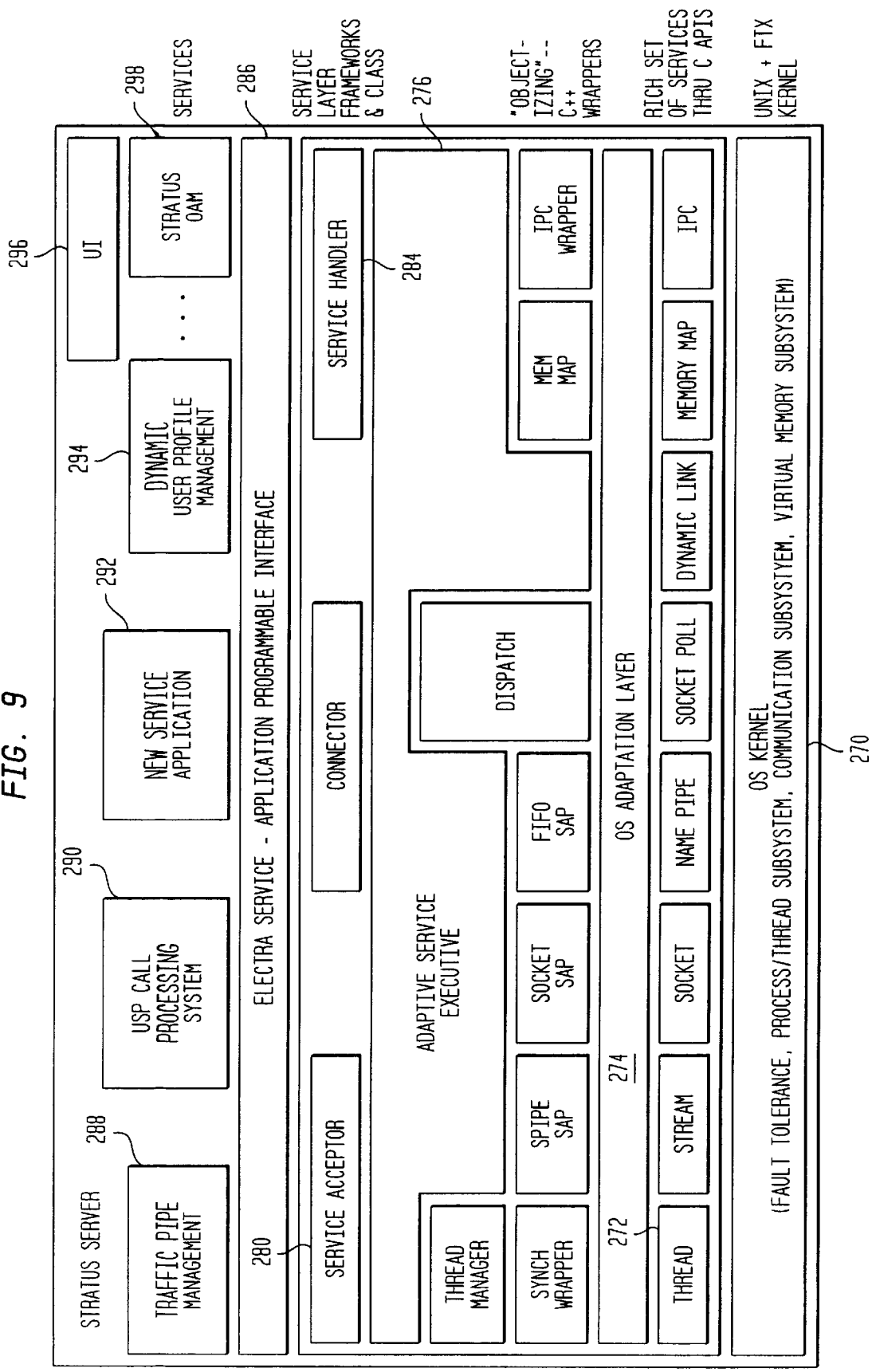
FIG. 9 illustrates a diagram of the application server platform software architecture.

FIG. 9 illustrates protocol hierarchy for the application server platform software architecture. The physical layer includes the operating system kernels 270 for fault tolerance, process/thread subsystems, communication subsystems, and virtual memory subsystems. The data link layer contains the following C application programable interface sets 272: thread, stream, socket, name pipe, socket poll, dynamic link, memory map, and IPC. The network layer contains the operating system adaption layer 274, the thread manager, synch wrapper, spipe SAP, socket SAP, FIFO SAP, MEM MAP, and IPC wrapper. The transport layer contains the adaptive service executive 276 and the dispatch 278. The session layer contains the service acceptor 280, connector 282 and service handler 284. The presentation layer contains application program interface 286 and the application layer contains the traffic pipe management 288, the universal signal processing call processing system 290, new service applications 292, dynamic user profile management 294, user interfaces 296, and the OAM&P services 298. These protocols use a fault tolerant Unix language to make the transition between interfaces transparent.

Figure 10:
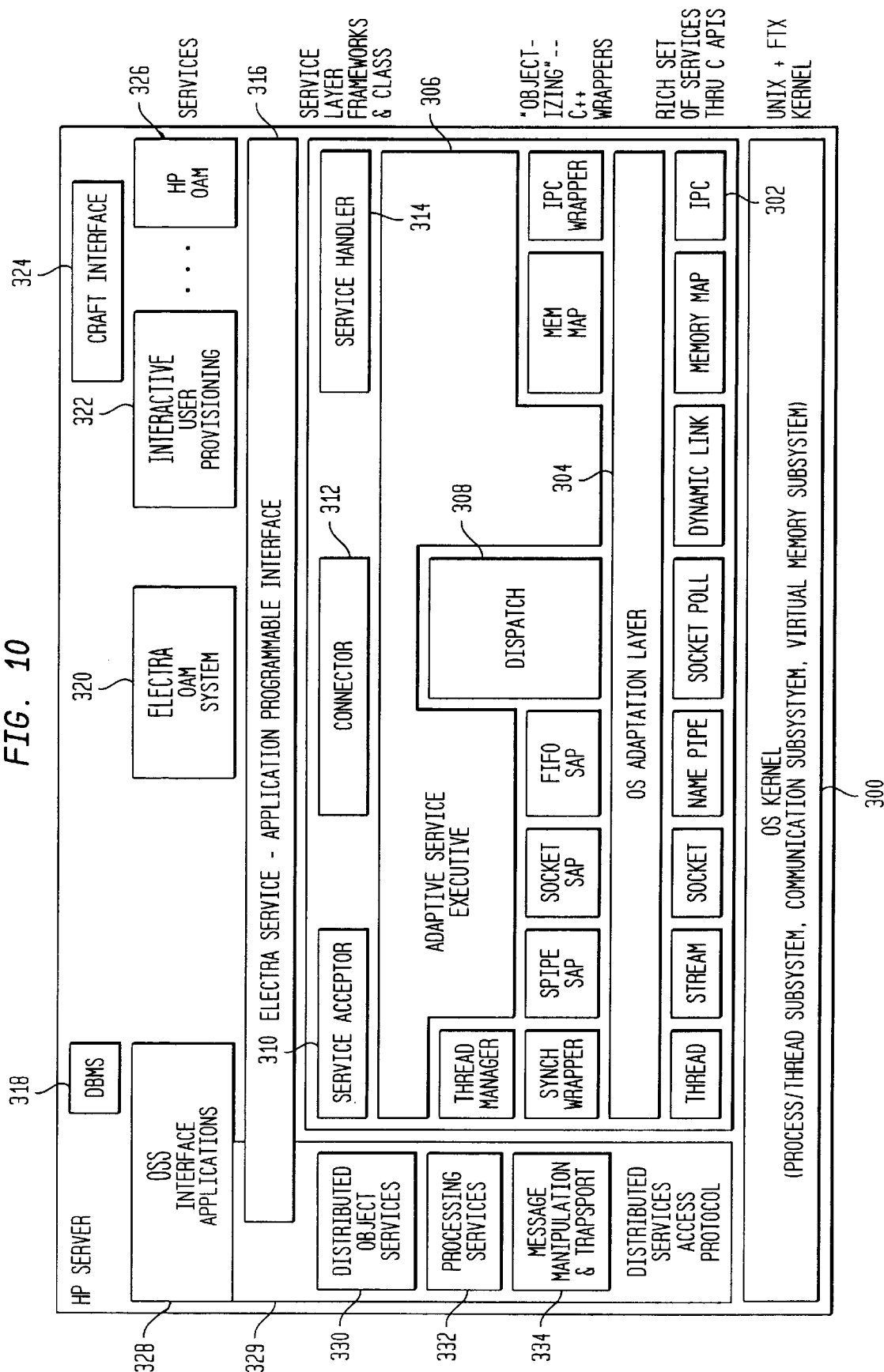
FIG. 10 illustrates a diagram of the operations, administration, maintenance and provision services in the server platform software architecture.

FIG. 10 illustrates the protocol hierarchy for the OAM&P server platform software architecture. The physical layer includes the operating system kernels 300 for fault tolerance, process/thread subsystems, communication subsystems, and virtual memory subsystems. The data link layer contains the following C application programable interface sets 302: thread, stream, socket, name pipe, socket poll, dynamic link, memory map, and IPC. The network layer contains the operating system adaption layer 304, the thread manager, synch wrapper, spipe SAP, socket SAP, FIFO SAP, MEM MAP, and IPC wrapper. The transport layer contains the adaptive service executive 306 and the dispatch 308. The session layer contains the service acceptor 310, connector 312 and service handler 314. The presentation layer contains application program interface 316. The application layer contains the database management system (DBMS) 318, the OAM&P system services 320, the interactive user provisioning 322, craft interface 324 and the HP OAM 326.

The OSS interface applications 328 are supported by the distributed services access protocol 329. The distributed services access protocol 329 is supported by the session layer distributed object services 330, the transport layer process services 332 and the network layer message manipulation and transport 334. These protocols also use a fault tolerant Unix language to make the transition between interfaces transparent.

Figure 11:
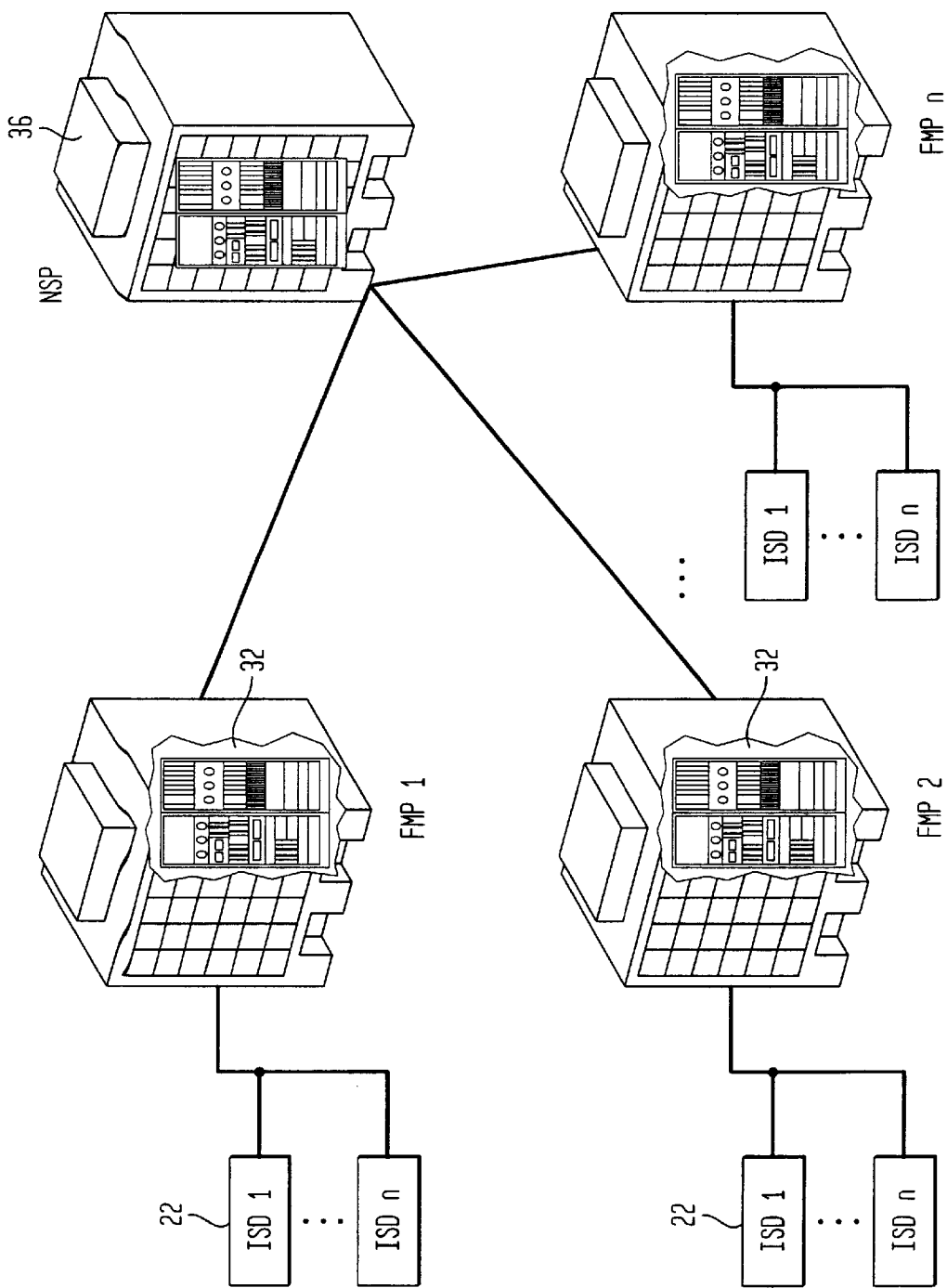
FIG. 11 illustrates a diagram of a single network server platform connected to a plurality of facilities management platforms that are in turn connected to a plurality of intelligent services directors.

FIG. 11 illustrates a diagram of a single NSP 36 connected to a plurality of FMPs that are in turn connected to a plurality of ISDs 22. The NSP 36 is connected to a communication network by trunk lines 40 and 42. By tying into the communication network, the NSPs 36 can communicate with each other and provide fault tolerant interaction should a particular NSP experience service problems. For a particular NSP 36, a plurality of FMPs 32 are registered with that NSP 36. The corresponding ISDs 22 connected to the registered FMPs 32 are also registered to the NSP 36. Because the NSP 36 recognizes the particular registered FMPs 32 and ISDs 22, caching frequently accessed information as well as developing user profiles can be stored at the NSP 36.

Figure 12:
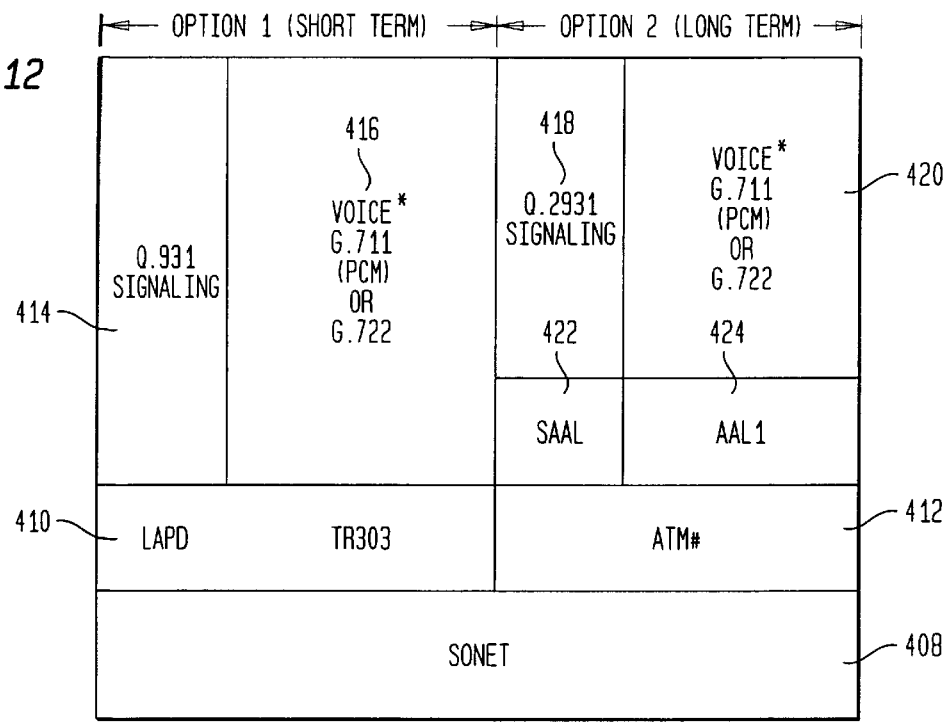
FIG. 12 illustrates a diagram of the systems and services voice protocol stack option from the facilities management platform to the network.

FIG. 12 illustrates the protocol hierarchy between the FMP and the network. The SONET protocol 408 is used in the physical layer for both short term (option 1) and (long term option 2). In the short term, the data link layer is supported by TR303 [410]. Eventually, the ATM 412 protocol will replace TR303 [410] in the data link layer. In the short term, the network layer is supported by Q.931 [414] for the transmission of signaling information and G.711 (PCM) or G.722 [416] will support the transmission of voice signals. In the long term, Q.2931 [418] will support signaling information and G.711 (PCM) or G.722 [420] will support the transmission of voice signals. In the long term, SAAL 422 and ATM adaption layer 1 (AAL1) 424 supports the signaling and voice traffic, respectively. The AAL is fully independent of the physical layer, and converts higher-layer information, such as data packets, into ATM cells for transmission across the ATM network. At the receiving end, the AAL converts the cells back into the higher-layer information.

Figure 13:
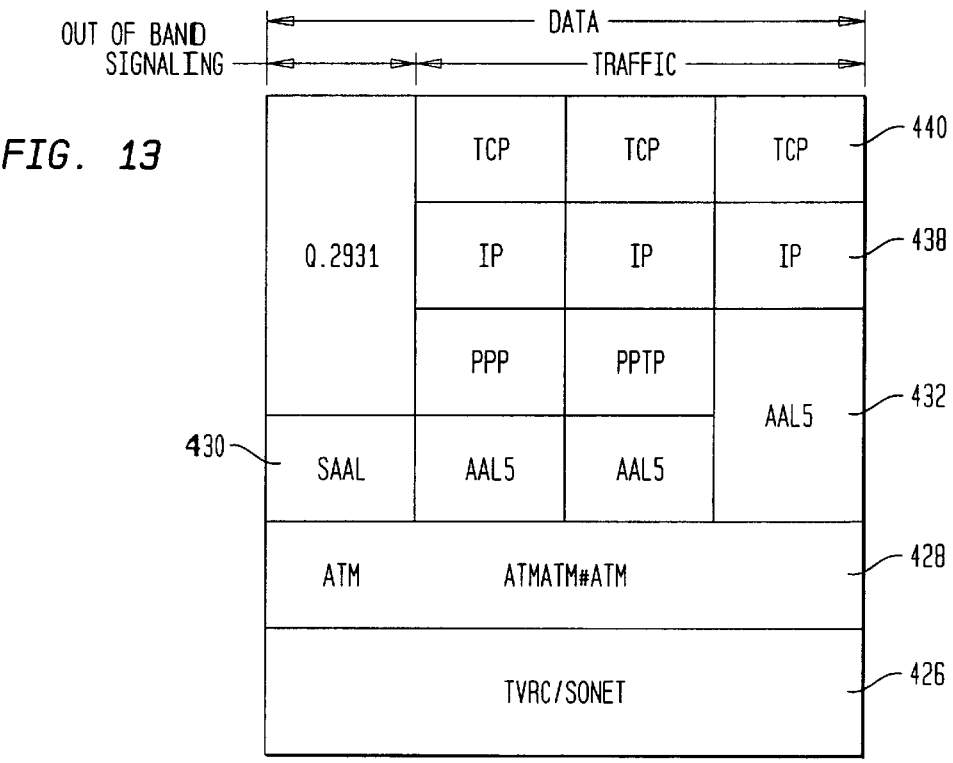
FIG. 13 illustrates a diagram of the systems and services data protocol stack from the facilities management platform to the network.

FIG. 13 illustrates the data protocol hierarchy between the FMP and the network. At the host-to-network layer, TVRC, SONET protocols 426 or ATM protocols 428 will be used for the transmission of data from the FMP 32 to the network. In the Internet layer, out-of-band signaling is performed by SAAL 430 and traffic is performed by AAL5 [432]. Also in the Internet layer, point-to-point 434 and point-to-point tunneling protocol 436 is used to transport traffic as well as IP 438. In the transport layer, traffic is supported by TCP 440.

Figure 14:
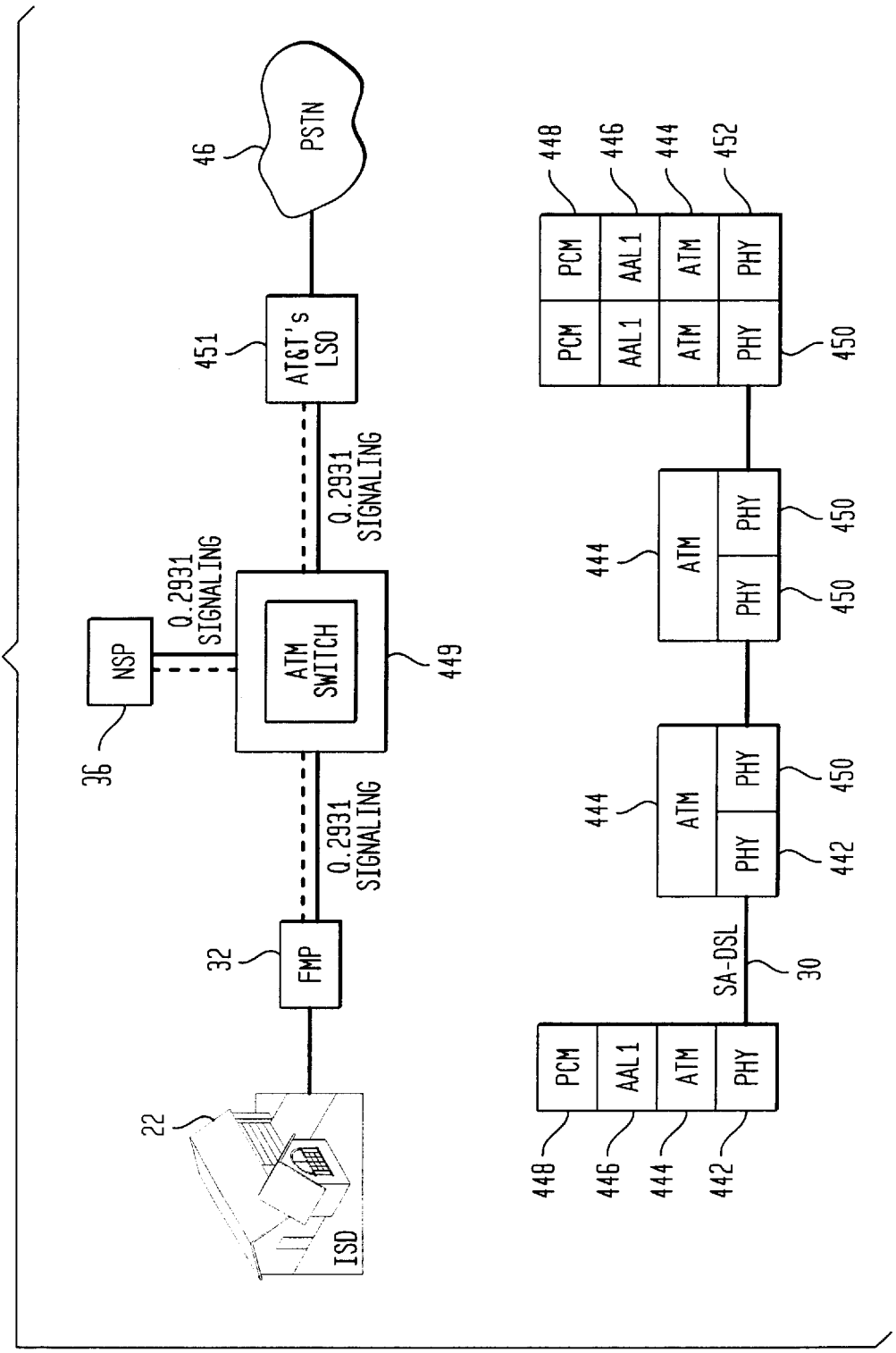
FIG. 14 illustrates a diagram of the systems and services protocol stack for voice services (Option 1) from the intelligent services director to the public switched telephone network using asynchronous transfer mode.

FIG. 14 illustrates the protocol hierarchy for voice services (option 1) employing end-to-end ATM. from the ISD 22 to the PSTN 46. The ISD 22 is connected to the FMP 32 by a self adaptive DSL 30 in the physical layer. The ISD 22, the FMP 32, ATM switch 449 and the local service office (LSO) 451 have their data link layer supported by ATM 444. The ISD 22 and the LSO 451 have their network layer by AAL1 [446] and their transport layer supported by PCM 448. At the FMP 32, the data link layer is supported by ATM 444. Links from the ATM switch 449 to the FMP 32, the NSP 36 and the LSO 451, have the signaling aspects of these connections supported in the physical layer by Q.2931.

Figure 15:
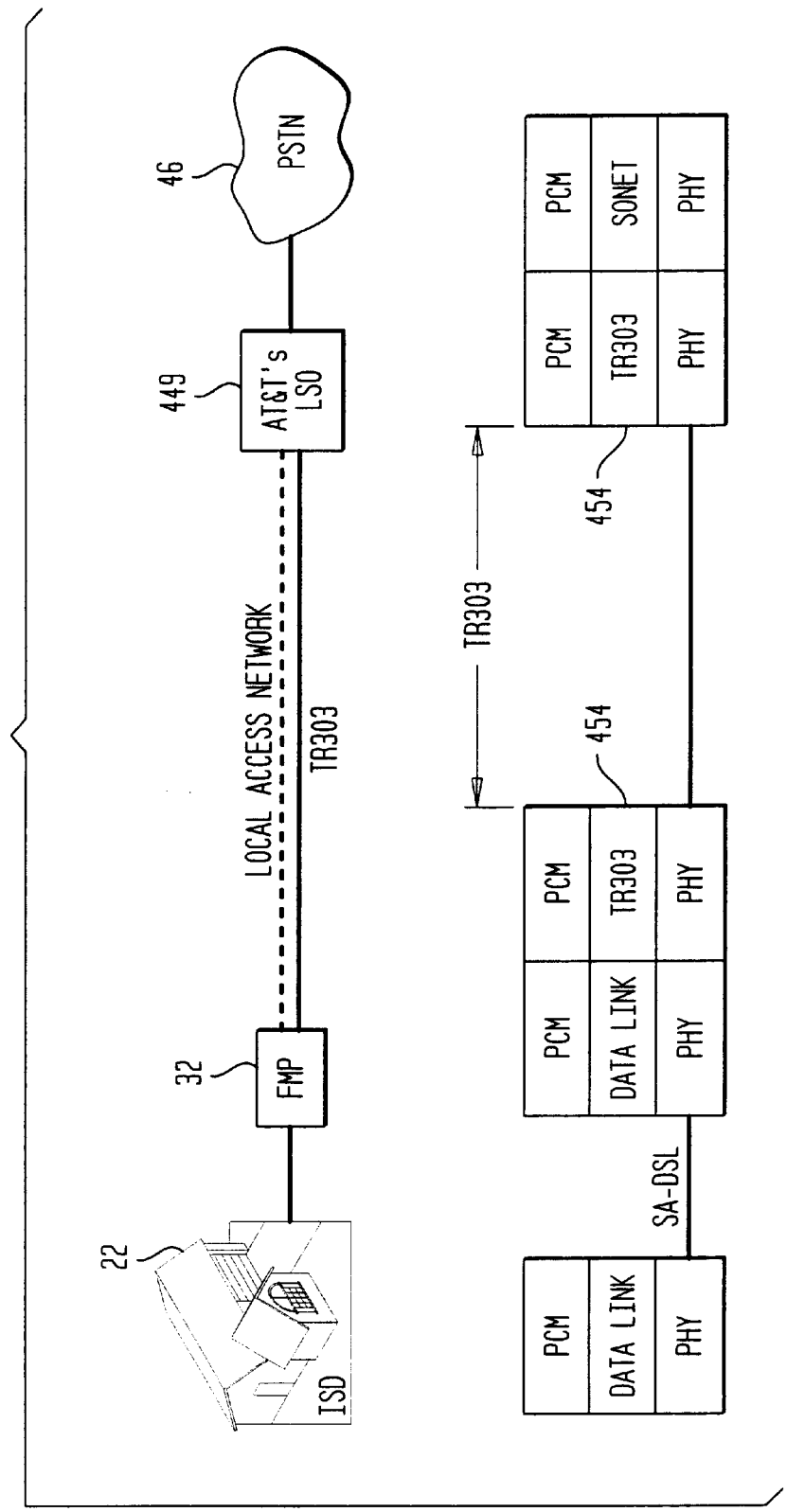
FIG. 15 illustrates a diagram of the protocol stack for voice services (Option 2) from the intelligent services director to the public switched telephone network using a TR303 interface.

FIG. 15 illustrates the protocol hierarchy for voice services (option 2) employing the TR-303 interface. The data link layer 454 in both the FMP 32 and the LSO 449 is supported by TR 303 across the local access network.

Figure 16:
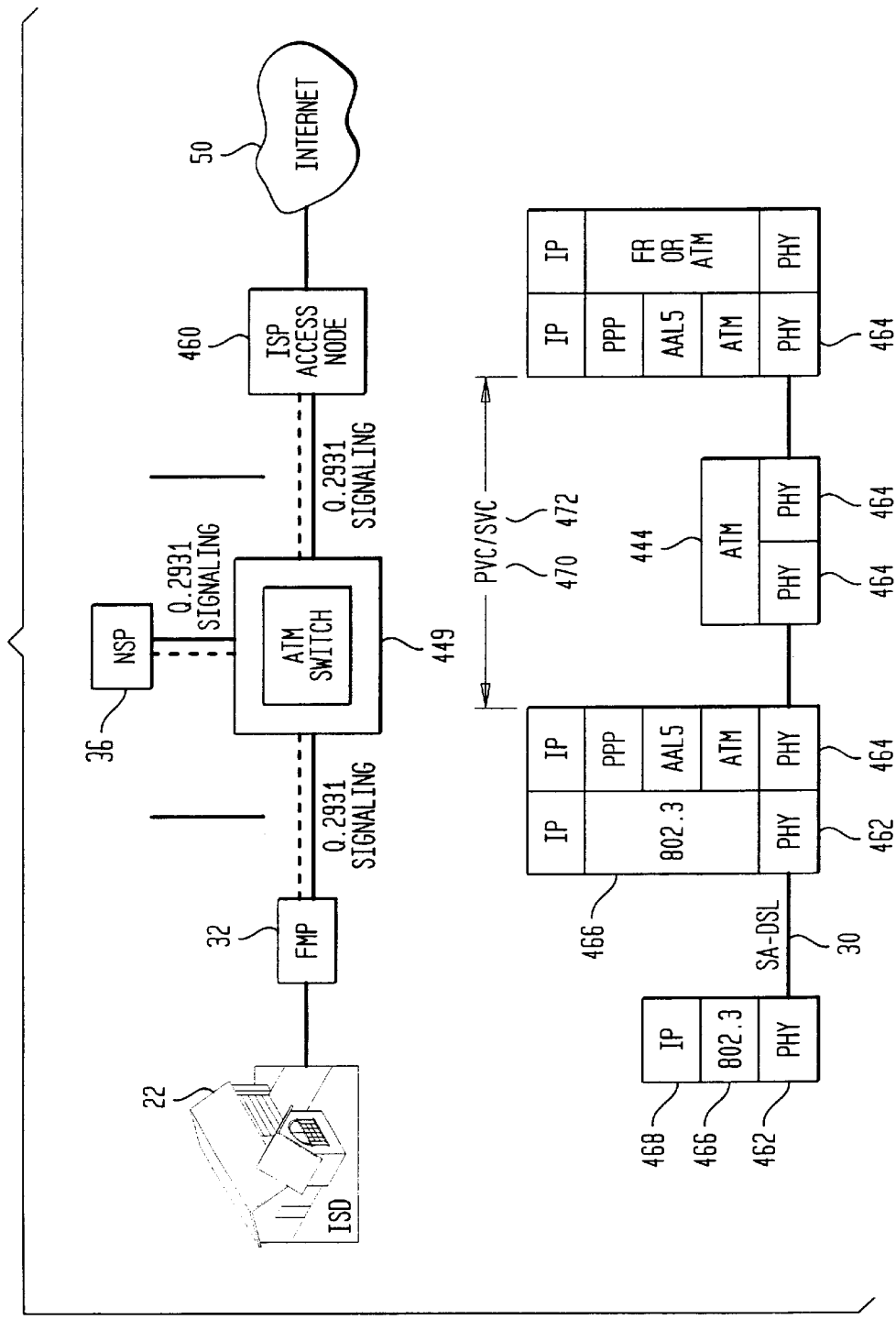
FIG. 16 illustrates a diagram of the systems and services architecture protocol stack for data services using point-to-point protocol in asynchronous transfer mode.

FIG. 16 illustrates the protocol hierarchy for data services employing point-to-point over ATM from the ISD 22 to the Internet backbone 50. The ISD 22 is connected to the FMP 32 by a self adaptive DSL 30 in the host-to-network layer. The Internet layer at the ISD 22 is supported by IEEE 802.3 [466] and the transport layer is supported by IP 468. At the FMP 32, IEEE 802.3 [466] between the physical layer and the Internet layer for connections between the FMP 32 and the ISD 22. For connections between the FMP 32 and the ATM switch 449, Q.2931 signaling is used. Between the FMP 32 and the ISP access node 460, a permanent virtual circuit (PVC) 470 can be established to save bandwidth associated with circuit establishment and tear down in those situations where certain virtual circuits must exist all the time. When these conditions do not exist, a switched virtual circuit (SVC) 472 can be established to dynamically establish a circuit on demand.

Figure 17:
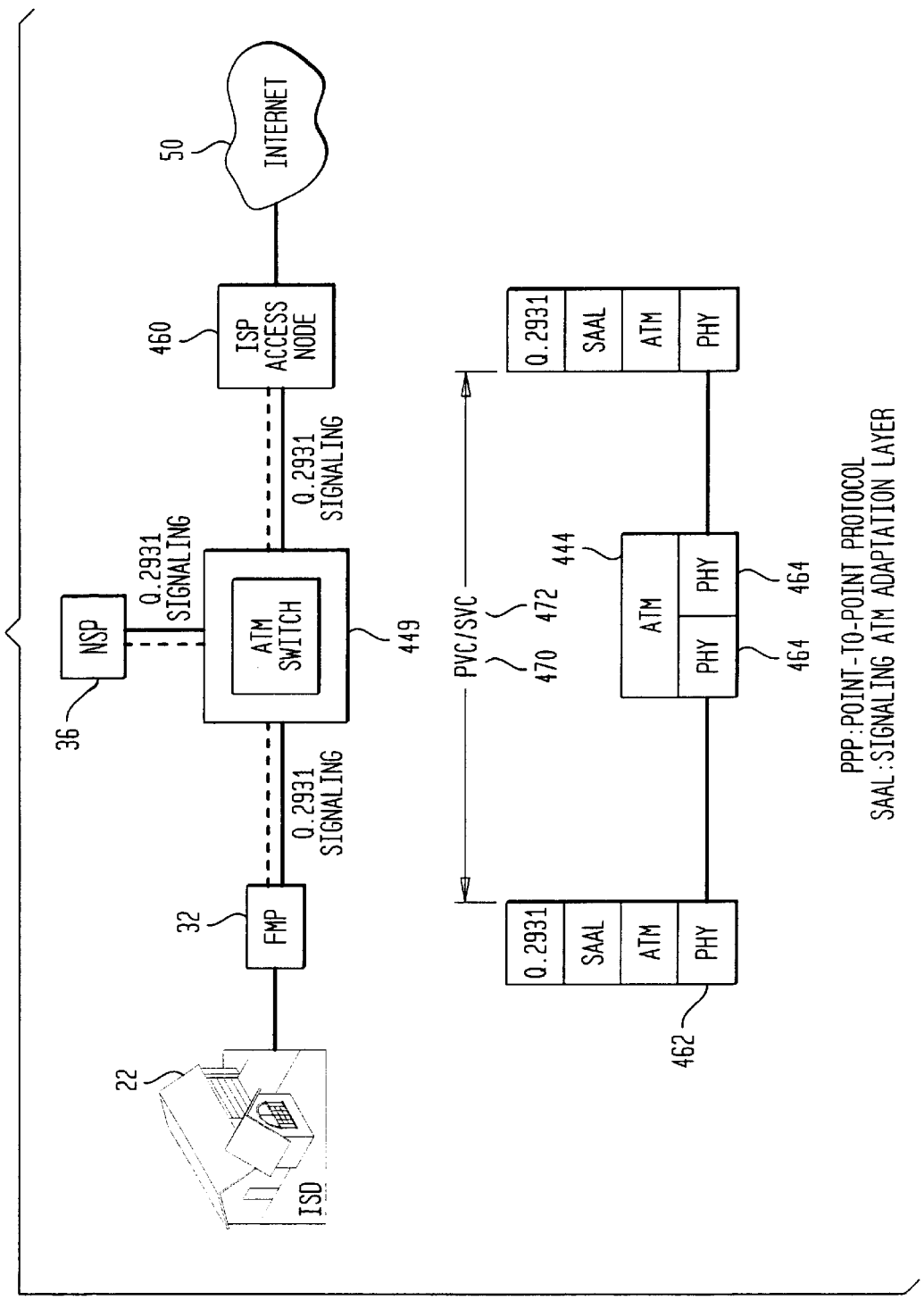
FIG. 17 illustrates a diagram of the systems and services protocol stack for data services using asynchronous transfer mode signaling.

FIG. 17 illustrates the protocol hierarchy for data services using ATM signaling. FIG. 17 is similar to FIG. 16 in that both PVCs 470 and SVCs 472 can be established based on system requirements.

Figure 18:
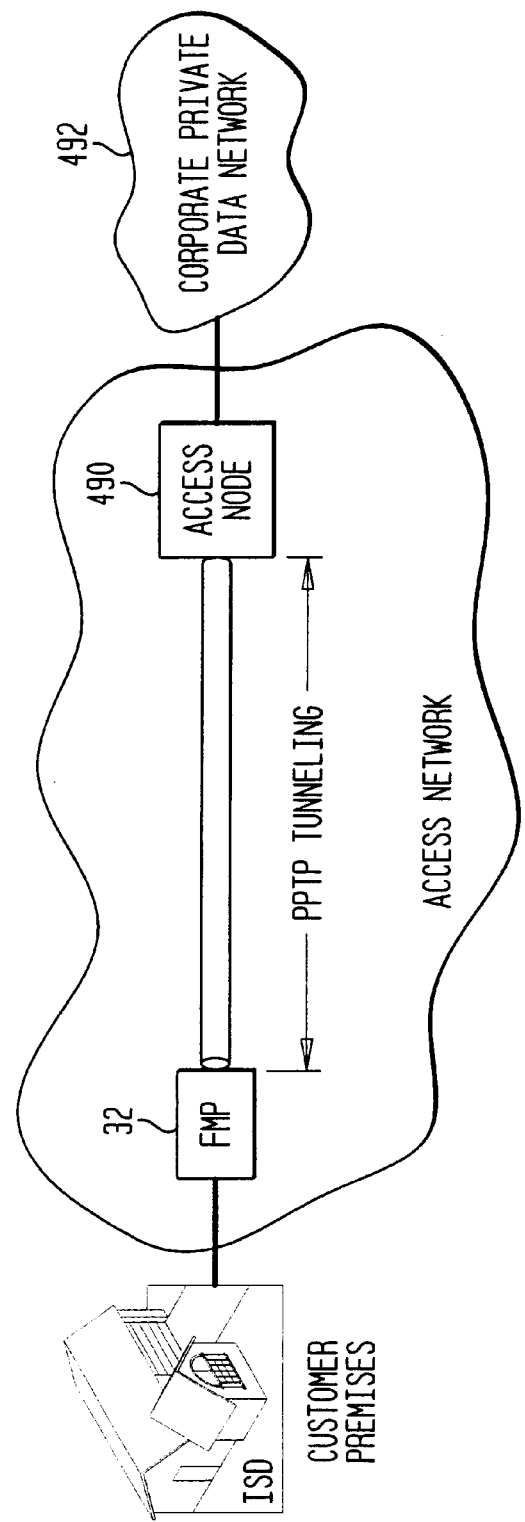
FIG. 18 illustrates a diagram of the systems and services architecture employing a virtual private data network "ExtraNet"

FIG. 18 illustrates the virtual private data network "Extranet" between the FMP 32 and an access node 490 using point-to-point tunneling protocol. Point-to-point tunneling protocol wraps point-to-point packets in an IP format and uses a layer three protocol. The flexibility of point-to-point tunneling protocol allows the implementation to be client initiated or client transparent, but does require IP support. From the access node 490, users can connect to corporate private data networks 492 to create a secure connection between the customer services equipment and a private network.

Figure 19:
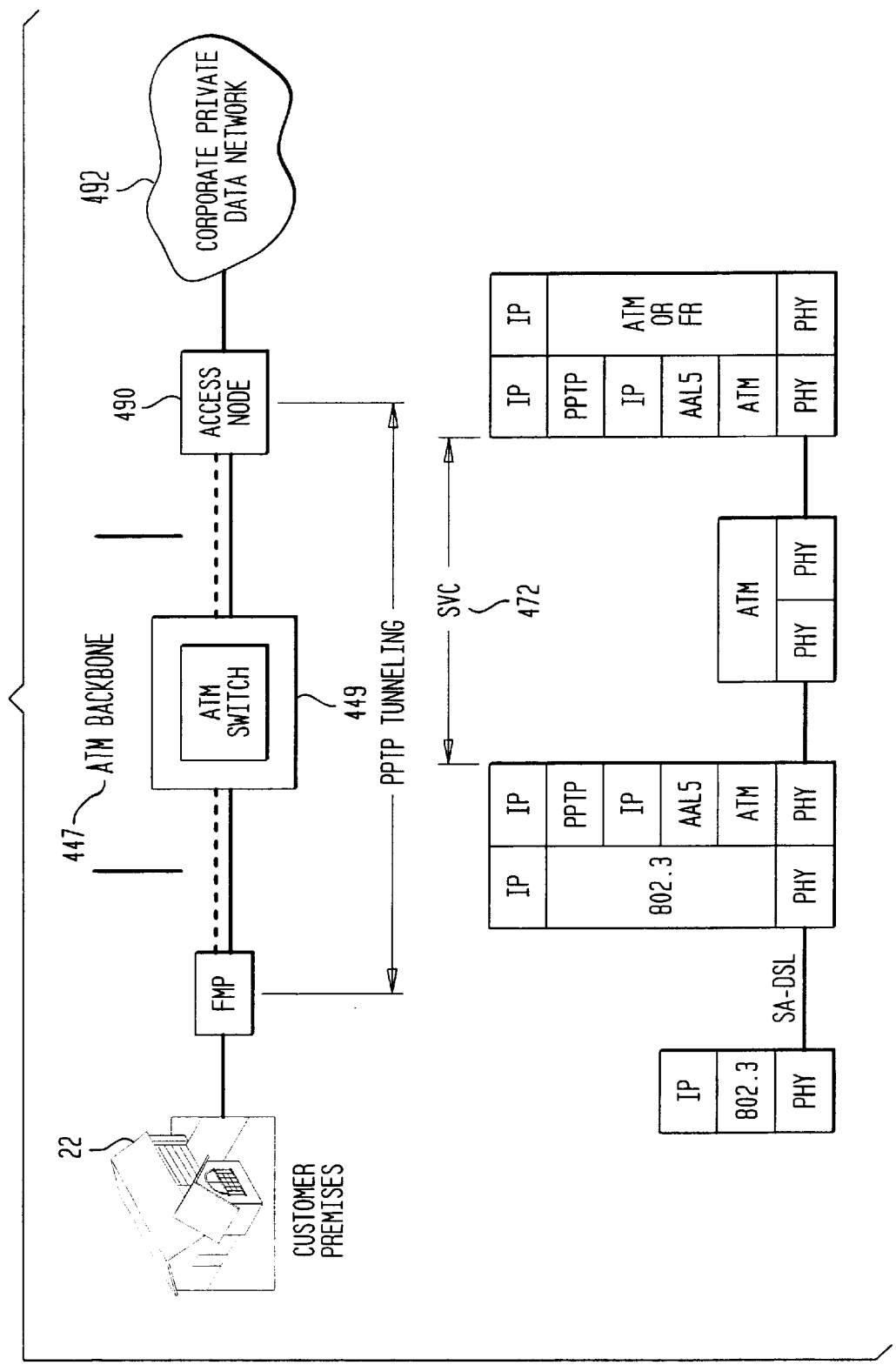
FIG. 19 illustrates a diagram of systems and services architecture of the virtual private data network "ExtraNet" protocol.

FIG. 19 illustrates the protocol hierarchy for establishing a point-to-point tunneling protocol from the customer services equipment to the private data network. The ISD 22 maintains a self adaptive DSL connection between the customer premises equipment and the FMP 32. Between the FMP 32 and the access node 490, data is sent along the ATM backbone via at least one ATM switch 449 in a switched virtual circuit (SVC) 472.

Figure 20:
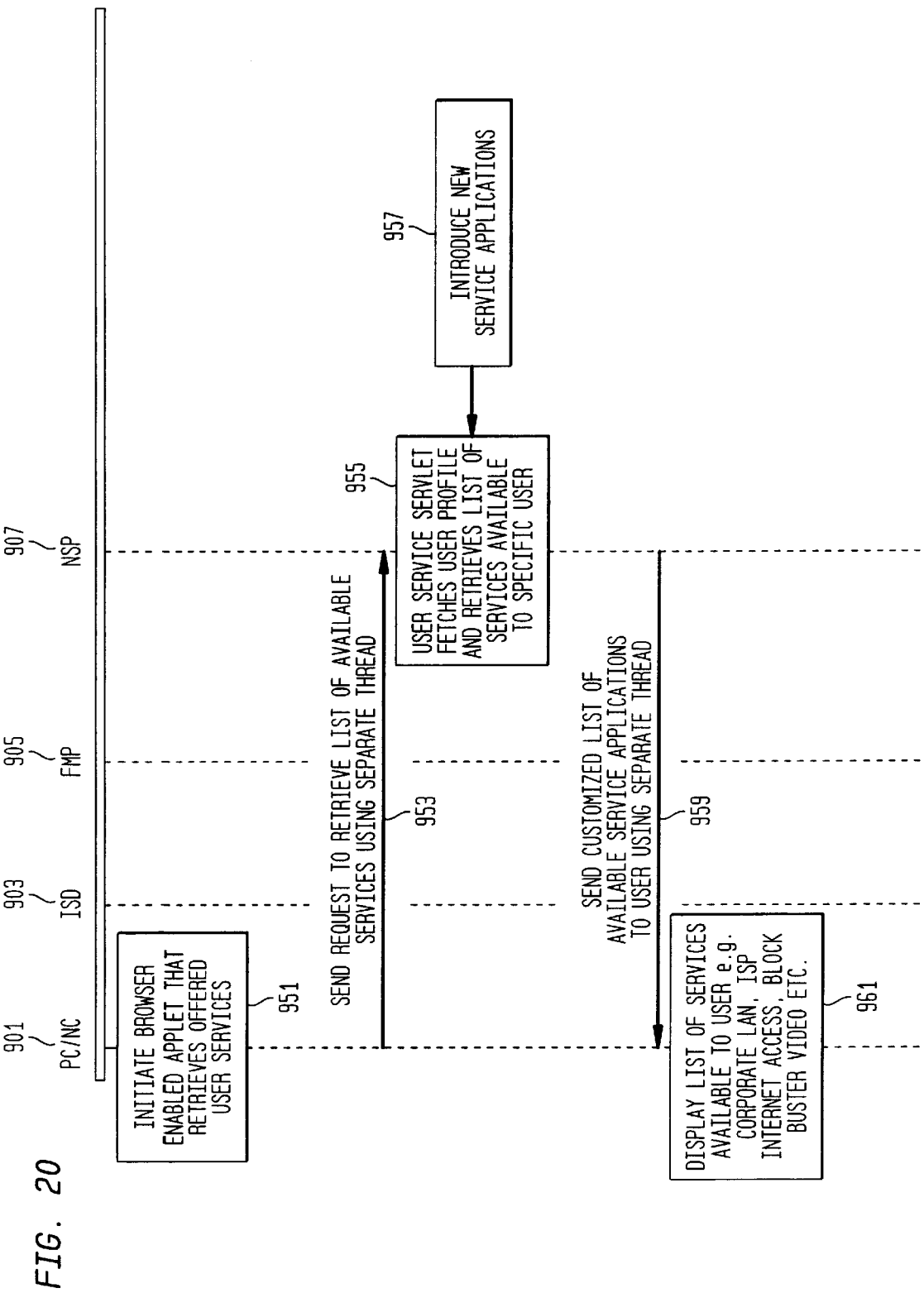
FIG. 20 illustrates a diagram of the systems and services architecture user service menu launcher.
Figure 21:
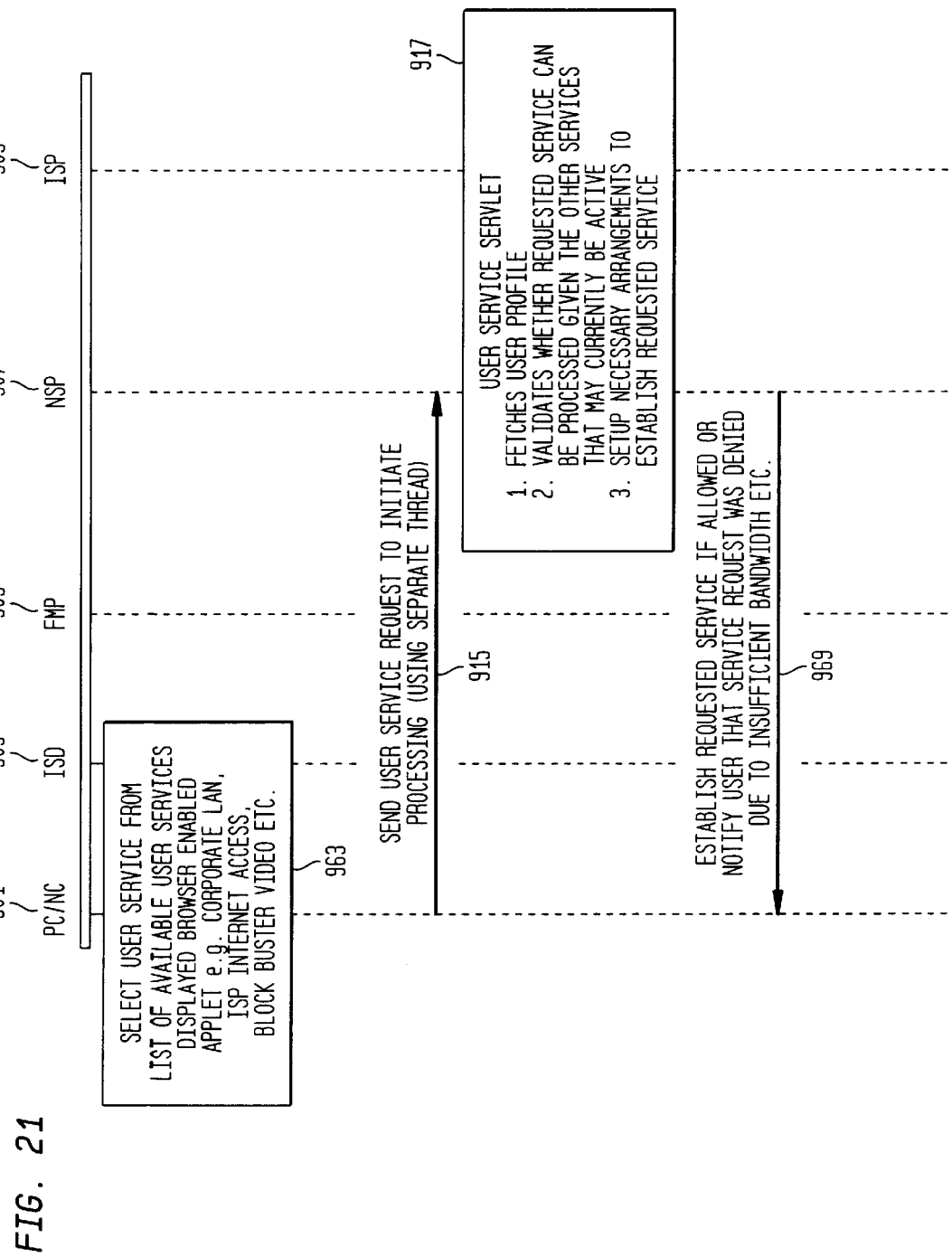
FIG. 21 illustrates a diagram of the systems and services architecture user service application manager.

FIGS. 20 and 21 comprise service processing flow diagrams for the network server platform (NSP) of the present invention; FIG. 20 shows from the time a user logs on to their personal computer (PC) or network computer (NC) to the time a menu list of accessible services is displayed on their computer display; FIG. 21 shows service processing from the time the user selects an available service to the time either service is allowed or denied.

FIGS. 20 and 21 comprise service processing flow diagrams for the network server platform (NSP) of the present invention. FIG. 20 shows service processing by the NSP 907 from the time a user logs on to their personal computer (PC) or network computer (NC) 901 to the time a menu list of accessible services is displayed on the user's computer display. FIG. 21 shows service processing from the time the user selects an available service to the time either service is allowed or denied. Referring briefly to FIG. 1, the personal computer, network computer and other home devices CPE 10 interface to an Intelligent Services Director 22 shown in FIGS. 20 and 21 as ISD 903. Further details describing the operation of the ISD may be found in U.S. application Ser. No. (#32). At a local serving office (LSO) or wire center is located a facilities management platform 32 (FIG. 1) shown in FIGS. 20 and 21 as FMP 905. Further details regarding the operation of FMP 905 may be obtained from reading U.S. application Ser. No. (#21). At a common carrier (toll carrier) point of presence according to FIG. 1 is shown the network server platform 36 of the present invention referred to in FIGS. 20 and 21 as NSP 907. An information service provider may have Internet or dial-up or other accessible information services provided from anywhere in any network shown in FIG. 1 and is alluded to but not further described in FIGS. 20 and 21 as ISP 909.

The service process is shown comprising steps 951 to 969. A key indicator and service process arrow are shown at the left of FIG. 20 to show service processing flow over time. A user at step 951 logs on to their computer 901 and typically using a windows application and a mouse initiates a browser enabled applet for retrieving user services. For example, an icon may appear on the user's computer display for service launch. By clicking or otherwise selecting the icon, the user initiates the transmission of a request to network server platform 907 via step 953. The request message comprises the user's identity and address so that messages may be returned to the user and command data such as a one indicating a command for returning available services. In particular, the message will suggest that the services be retrieved using a separate thread. By thread is intended a term suggestive of a link but is in fact a virtual link that may be provided in various known ways and particularly requires a slow speed or small bandwidth of data transmission capability. Referring briefly to FIGS. 20 or 21, threads are not as bandwidth intensive, for example, as a stream (data stream) or pipe.

The network server platform 907 now must operate internal software algorithms for matching the identity of the user to available services. The services may be services to which the user has subscribed on a pay basis or services that are free, for example, and available over the Internet. At step 955, a user service servlet fetches a user profile for the identified user and retrieves a list of services available to that specific user. In addition, new services that may have been provisioned via the OAM&P may be determined for eventual announcement to the user. This step is shown as step 957.

A low speed data thread having been determined, at step 959, the list of available and newly offered services customized for that user is provided to the user that initiated the request at step 951. Finally at step 961, a list of available services is displayed. The icon screen disappears and a new menu screen of listed available services is displayed for possible selection. These may comprise and are not limited to, for example, the availability of connection to a corporate LAN or WAN for telecommuting. A telecommuting application of the present invention is described in U.S. application Ser. No. (#28). Another application is information service provider (ISP) Internet access. An ISP access application is further described by U.S. application Ser. No.

(#27). Another opportunity is for the user to view their service bill and make payments, etc. An NSP Integrated billing system is described in U.S. application Ser. No. (#30). Telephone directory for either personal or commercial (white or yellow pages) listings is also possible. The directory service application is further described by U.S. application Ser. No. (#29). Yet another service application is the availability of home entertainment such as digital audio and/or video program services via multicasting from a central network source. An NSP multicast application is described by U.S. application Ser. No. (#26). Other services are likewise possible in a new and unique way via the Network Server Platform (NSP) of the present invention. The variety of the service opportunities are only limited by the imagination of the service provider.

Figure 22:
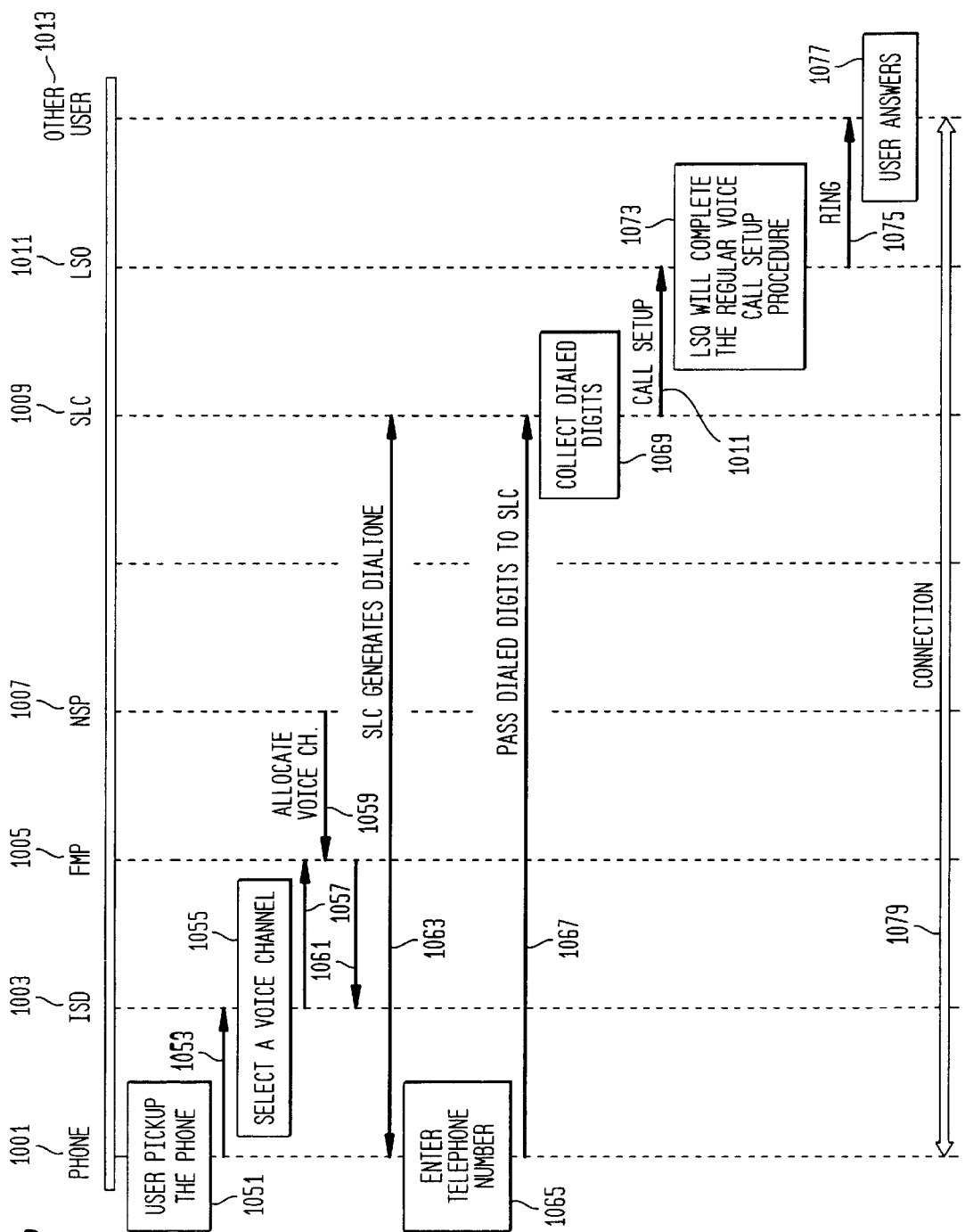
FIG. 22 illustrates a diagram of the systems and services architecture for basic voice.

FIG. 22 shows a service processing flow diagram for providing a basic voice service via the Network Server Platform of the present invention wherein the user may identify the called party by audible name as an alternative to dialing digits. FIG. 22 illustrates a systems and services process flow diagram for a basic voice service. Basic voice service is well known from a local phone company or local exchange carrier (LEC). What differentiates the present service flow process is that service is provided by a common toll carrier bypassing the LEC and the service may include voice or audible identification of the called party as an alternative to rotary or tone dialing. There are generally three steps to LEC dialing that are simulated here: 1) provision of dial tone to indicate that the carrier is ready to accept called party name or address identification (Steps 1051–1063), 2) name or address input, look-up and call setup (steps 1067–1071) and 3) call processing through to connection to a called party (steps 1073–1079). Now the process will be described in further detail, particularly in the context of a voice dialed call.

Across the top of FIG. 22 from left to right are shown the individual components of the system of the present invention which are actuated and utilized in the present voice service processing. The phone 1001 is a plain old telephone shown in FIG. 1 as telephone 15 of CPE 10. The ISD 1003 refers to intelligent services director (ISD) 22 of FIG. 1. The FMP 1005 refers to the facilities management platform (FW) 32 of FIG. 1. NSP 1007 refers to the Network Server Platform (NSP) 36 of FIG. 1. SLC 1009 refers to subscriber loop carrier modified as necessary to provide call connect services and a voice carrying channel as required. LSO 1011 refers to the local serving office of a toll common carrier such as AT&T. "Other user" 1013 refers to the local exchange carrier or other termination for a called party's telephone.

At step 1051, a caller picks up the hand set of their telephone in order to release the switch-hook which typically provides a connection to local battery. The step of signaling of an off hook indication to ISD 1003 is represented by arrow 1053. The ISD 1003 of the present invention terminates the telephone and performs the task of providing local telephone battery power operation. The ISD 1003 recognizes that the user has gone off hook at step 1055 and selects a voice channel to FMP 1005. The voice channel is a typical low bandwidth voice channel and its allocation is shown as step 1057. Now the FMP 1005 signals the NSP 1007 and requests it to allocate a voice channel at step 1059. The NSP 1007 refers to its circuit provisioning opportunities and availabilities and obtains a subscriber loop carrier channel for connection to a local serving office 1011. The NSP 1007 also returns a message to the FMP that a voice channel has been allocated within step 1059 and FMP 1005 so signals the ISD 1003 at step 1061. The ISD 1003 provisions for the link from the SLC 1009 to the phone 1001. The subscriber loop carrier system 1009 either provides dialtone itself or couples with a dialtone generator at step 1063. The user at phone 1001 thus receives dialtone from a toll common carrier in a manner that simulates how the user would receive dialtone from a LEC in a conventional manner.

Once steps 1051–1063 have been performed, the user is ready to identify the called party. In a conventional manner, at step 1065, the user dials a number. The dialed tone or rotary dial pulse entries are converted by the ISD 1003 and transmitted as digital data for collection at SLC 1009. This dialed digit transfer is shown as step 1067. The collection of dialed digits via the SLC 1009 is shown as step 1069. Then, the call is set up via the local serving office 1011 at step 1011.

On the other hand, perhaps the touchtone dial is broken or otherwise refuses to operate or voice dialing is desired as a service feature. Voice dialing may be launched by any number of alternative means. One means would be for the SLC 1009 to await dialed digits for a period of time and then allow for voice commands. Another means might be to immediately record voice received by the telephone mouth piece or microphone of telephone 1001. For example, the ISD 1003 may immediately or after a brief delay begin to digitize voice information, for example, via 64 kbps mu-law PCM data or other form of voice or audio coding/compression. The samples are then stored in a wave file of the ISD 1003 for subsequent transmission to the FMP 1005, for example, over a signaling channel. On receipt, the FMP 1005 forwards the voice data to the NSP 1007. The NSP 1007 may attempt to authenticate the request by ensuring that the subscriber or user has subscribed to the service or provides the service via, for example, a life-line emergency service. The NSP can determine the identity of the subscriber by looking at an address of an Internet Protocol (IP) field of a data message packet. The NSP 1007 can therefore reconstruct (if compressed) and interpret the information in the wave files of the ISD 1003 and take the appropriate action.

Let us assume that subscriber John wants to call a party Paul. Paul may already be identified in a personal directory for John by speech recognition circuitry as is known in the art by training the speech recognition circuitry. The NSP 1007 will attempt to determine who Paul is as defined by John in John's personal directory. A look-up table corresponds the spoken Paul to a directory number for Paul. Once the directory number for Paul has been determined by the NSP the equivalent of collecting dialed digits has been performed. The NSP 1007 can inform the FMP 1005 to set up a call to Paul's directory number. The FMP 1005 then may use a TR303 signaling or other interface to signal and set up a connection to Paul. The SLC 1009 receiving the directory number signaling from the FMP 1005 now is in the same position as it was at step 1069 of FIG. 22.

Continuing now with FIG. 22, steps 1071–1079, at step 1071, the SLC 1009 requests the LSO 1011 to select the appropriate ports to use for setting up the call to Paul. At step 1073 the local serving office will complete the regular voice call setup procedure. At step 1075, it rings the called party Paul. At step 1077, the local serving office 1011 detects user answer. Then a connection is established at step 1079 via the SLC channel 1009 between John and Paul.

It is important to note that the alternative digital or voice dialing service is being provided locally via the toll carrier's local serving office (LSO). There should be no need in the United States to pay for the Local Exchange Carrier (LEC) for providing such services. Similar services to voice dialing such as speed dialing, personal directory dialing and the like can now be made available locally by a toll common carrier according to the present invention.

Figure 23:
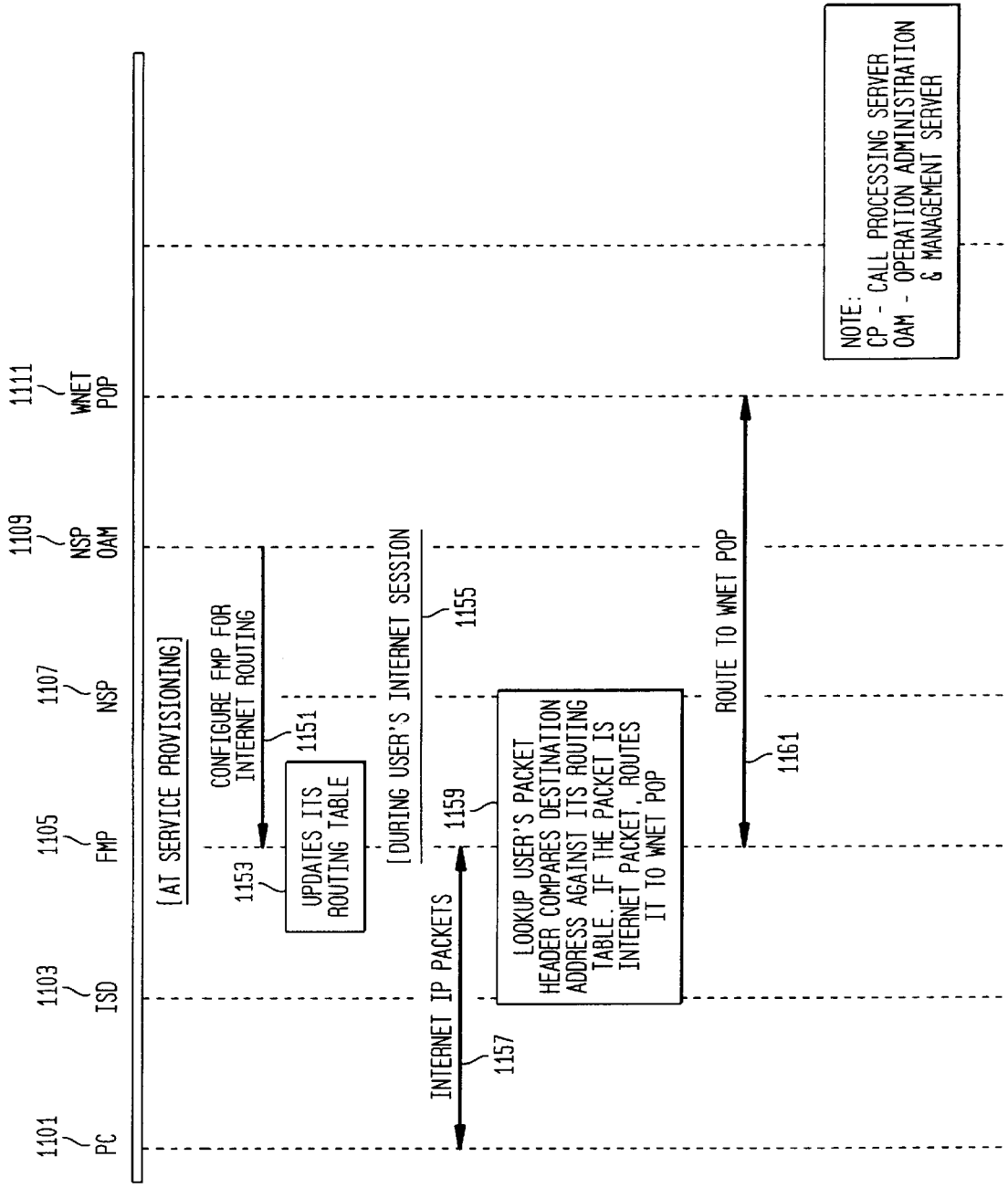
FIG. 23 illustrates a diagram of the systems and services architecture for Internet connectivity.

FIG. 23 is a service process flow diagram for showing how the NSP in concert with an FMP provides Internet service connectivity via, for example, an Internet Service Provider's point of presence (POP) using AT&T's WorldNet Internet service as one example. FIG. 23, illustrates another example of service connectivity by an NSP 36 as already generally described by FIGS. 20 and 21. In the application shown in FIG. 23, any user may directly connect to an Internet service provider (ISP) at great bandwidth (bit rate) without having to connect via a local exchange carrier (LEC). The same convention as previously used with respect to FIG. 10 is used here as well. Components of the system and service architecture are shown at the top including personal computer (PC) 1101, intelligent services director (ISD) 1103, facilities management platform (FMP) 1105 and network server platform (NSP) 1107. The Operations, Administration, Management and Provisioning server of the NSP 1107 is also shown as NSP OAM 1109. Finally, by way of example, a point of presence for an Internet service provider, namely AT&T's WorldNet service, is shown as Wnet POP 1111.

As already described, bandwidth to the home or premises of a business may vary but may be in excess of 1 megahertz according to bandwidth allocation procedures followed by the ISD 1103 and FMP 1105. Thus, there is a great advantage in a user having access to the Internet connectivity feature shown in FIG. 23 because the user has greater bandwidth availability and has immediate access to AT&T WorldNet, for example, via NSP 1107 bypassing the LEC.

Initially, the OAM&P server of the NSP 1109 provisions the Internet connectivity service by signaling and provisioning the FMP 1105 with address, routing and other data the FMP 1105 needs. Step 1151 is directed to configuring the FMP 1105 serving the user of PC 1101 for Internet service routing to, for example, AT&T WorldNet Internet Service point of presence 1111. As a result, the FMP 1105 updates its internal routing table of its memory with provisioned routing data for routing to Wnet POP 1111.

Assumed that a user has turned on their personal computer 1101 and wants to establish an Internet session. As already described, one of the services that may be offered the user as a menu display option is Internet service connectivity. The user clicks on or otherwise inputs their selection of Internet service connectivity. The personal computer 1101 via the ISD 1103 obtains immediate access to the already provisioned FMP 1105 at step 1157 as the user's Internet session begins. At step 1157, Internet protocol (IP) data packets are forwarded and returned via the FMP 1105. The FMP 1105 now acts as a mini-server and performs steps 1159. The FMP 1105 looks up the user's packet header and compares the destination address against the routing table that was provisioned at step 1151. The routing table then provides routing data for routing the IP packets to, for example, AT&T WorldNet Internet service at Wnet POP 1111. Step 1161 suggests the routing of IP packets to the Wnet POP 1111 and an exchange of packets that follows via FMP 1105 to PC 1101. Note that the local exchange carrier is not involved and the bandwidth and data rate for exchange of Internet IP packets may be the maximum bandwidth permissible by the facility between the FMP 1105 and the PC 1101. FIG. 23 similarly describes the process of routing to other destinations of a routing table of FMP 1105 that has been provisioned by NSP OAM 1109. For example, besides serving as a gateway to the Internet, the NSP may provide a gateway to applets from a JAVA based server for such things as bill paying, utility meter reading, energy management, security services for any connected device (for example, a device at a customer premises (other than a personal computer) such as the VisionPhone described earlier or other device.

Figure 24:
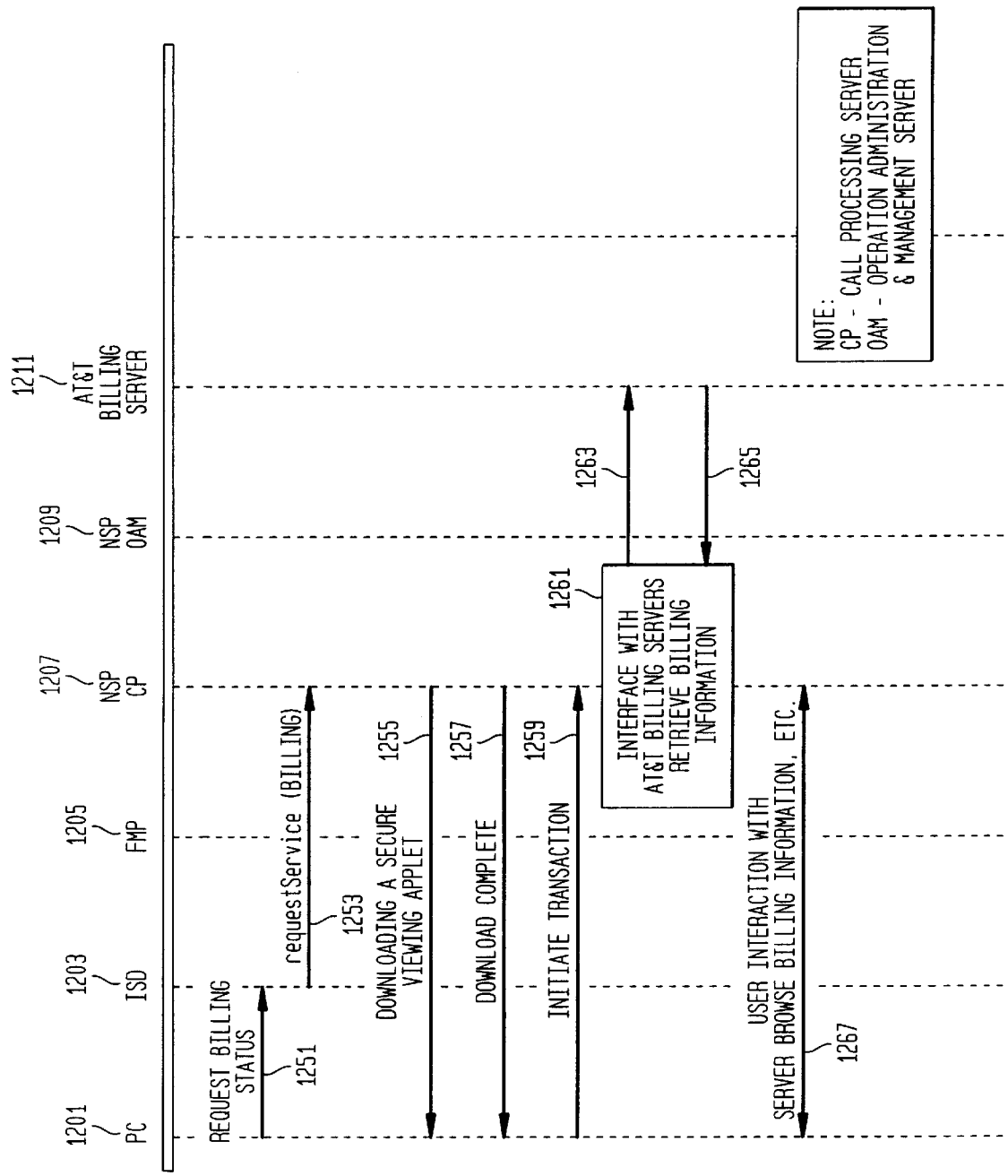
FIG. 24 illustrates a diagram of the systems and services architecture for AT&T bill viewing services.

FIG. 24 is a service process flow diagram for showing how the NSP in concert with an ISD provides a bill viewing and paying service via, for example, a billing server such as an AT&T billing server as one example. FIG. 24, illustrates another example of service connectivity by an NSP as already generally described by FIGS. 20 and 21. In the application shown in FIG. 24, any user may directly connect to a billing server that may be one for a utility, a bank, a credit card company or other creditor where an AT&T billing server is shown by way of example without having to connect via a local exchange carrier (LEC). The same convention as previously used with respect to FIG. 22 is used here as well. Components of the system and service architecture are shown at the top including personal computer (PC) 1201, intelligent services director (ISD) 1203, facilities management platform (FMP) 1205 and network server platform (NSP) call processing server 1107. The Operations, Administration, Management and Provisioning server of the NSP is also shown as NSP OAM 1209 but is not otherwise described below. Finally, by way of example, a billing server is shown by way of example, namely an AT&T billing server 1211. One advantage of the present invention is that a billing server may comprise a clearing house for a plurality of bills. For example, an AT&T billing server 1211 may provide a bill viewing and payment opportunity for local phone service, toll phone service, Internet (for example, AT&T WorldNet service), digital audio and video program delivery services and other information and communication services.

As already described, bandwidth to the home or premises of a business may vary but may be in excess of 1 MHZ according to bandwidth allocation procedures followed by the ISD 1103 and FMP 1105. Nevertheless, a bill viewing and paying service does not require the bandwidth in either direction of data transmission as, for example, would be required for providing video conferencing. Referring to FIG. 24, the user from their personal computer, intelligent telephone or video phone 1202 requests a billing viewing and paying service as already described generally by FIGS. 20 and 21 at step 1251. Typically the user has selected an icon (for bill viewing and paying services) on a display screen by clicking on the icon. The ISD 1203 in response transmits a request message for the service to the NSP 1207 at step 1253. The message as already described must contain a service identifier, for example, BILLING. The NSP call process server 1207 responds to the message by looking to internal algorithms for billing services. In the internal algorithms it may be determined that a secure billing channel is required. As a result of the billing service look-up, then, the NSP CP 1207 downloads a secure viewing applet at step 1255 to the personal computer or other terminal 1201. The personal computer then may recognize that security is required for the service and may choose to secure, for example, by encryption or other means any future communications. The NSP 1207 and the PC 1201 must be sure that each other understands the security provisions put in place by each. Each device must know how to decrypt each other's communications by exchange any security keys and the like. Once the download is complete at step 1257, a transaction may be initiated. It may be assumed that communications within the AT&T network are secure, but communications over the local loop or other facility connecting the PC or other terminal 1201 with the NSP 1207 remote from the PC may not be as secure.

It may be assumed, by way of example, that a user has requested AT&T bill viewing and payment service. The transaction with the AT&T billing server then is initiated at step 1259 by the terminal 1101 signaling the NSP CP 1207. The interface with the AT&T billing server 1211 may be by any convenient method to the toll carrier service provider. Again, the channel is secure, within or outside the toll carrier network and may be provided with or without encryption security. At step 1263, the bill is requested and data returned at step 1265 to the NSP which converts the received data as necessary for eventual display or other use by the user. Preferably, at step 1267, the user will be able to interact with the bill viewing service by viewing any portion of the bill the user wants and may communicate and question any billing item of any service provider. Also, the user may arrange to pay the bill by providing, for example, AT&T universal or other credit card information or other payment option such as direct debit from a bank account.

Figure 25:
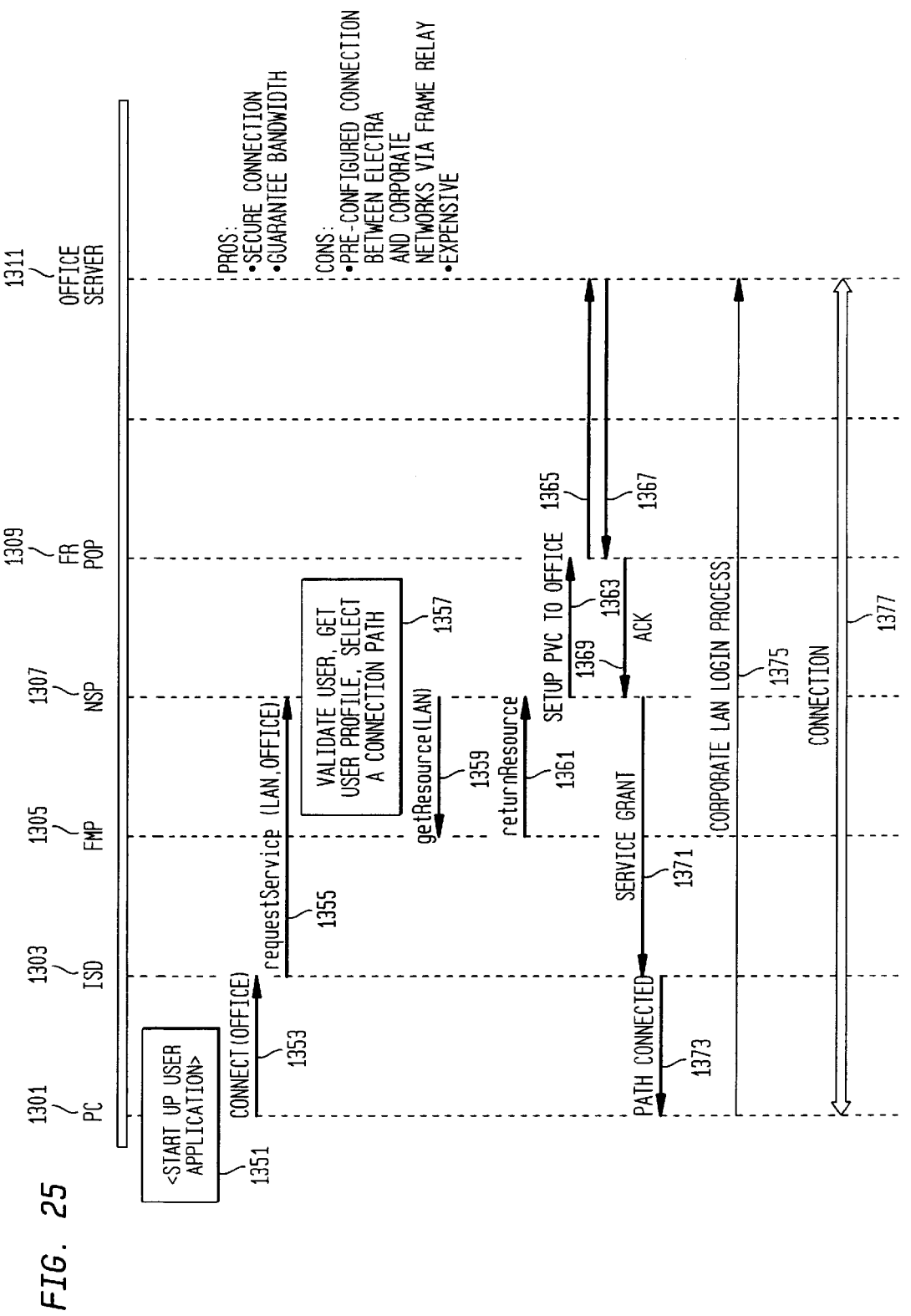
FIG. 25 illustrates a diagram of the systems and services architecture describing the telecommute over MetroLan using a frame relay backbone.
Figure 26:
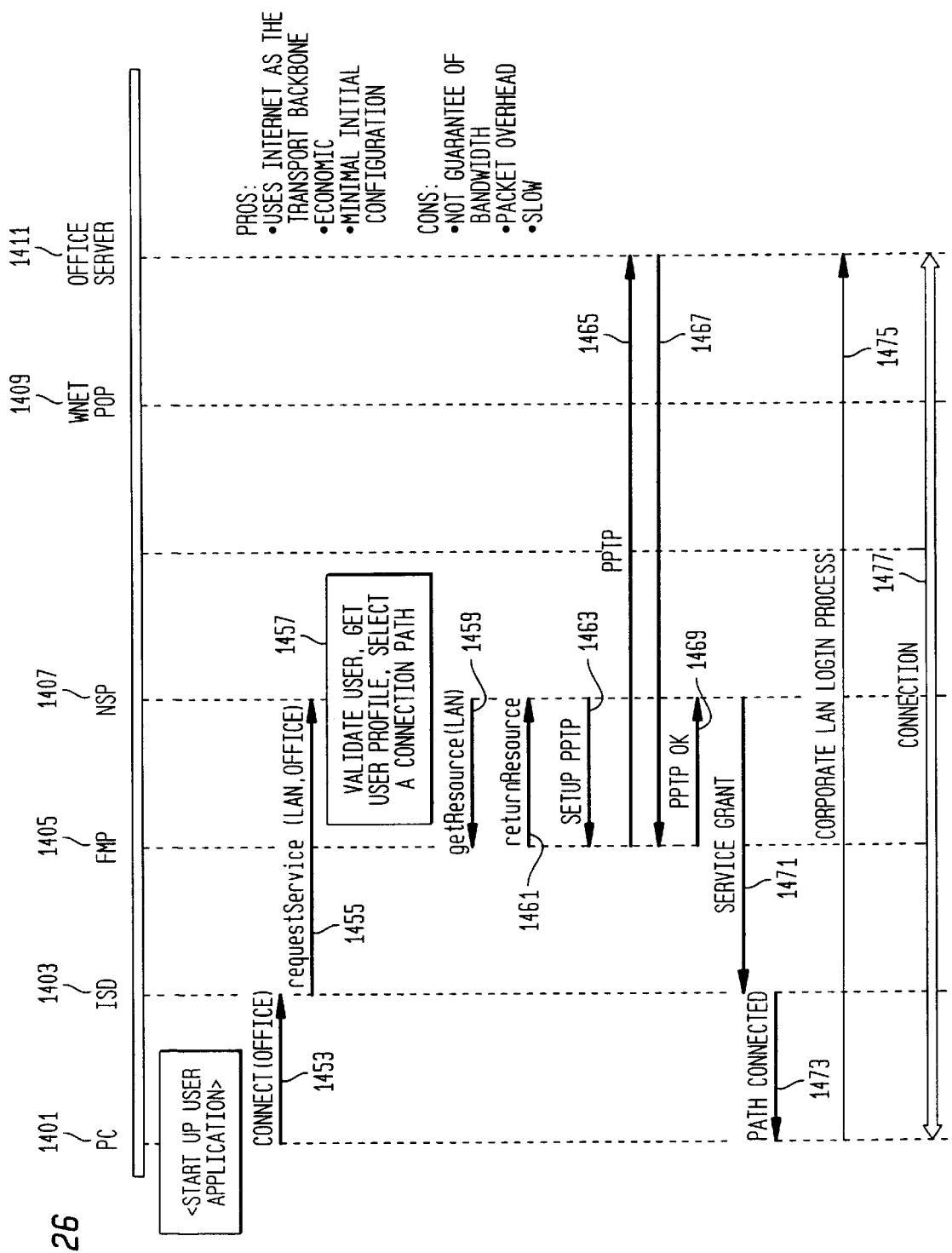
FIG. 26 illustrates a diagram of the systems and services architecture describing the telecommute over MetroLan using the Internet.

FIGS. 25 and 26 each show service process flow diagrams for providing telecommuting services from the home; FIG. 25 is a service process flow diagram for showing how the NSP 36 in concert with an ISD 22 provides a telecommuting service via, for example, an employer's office server using a frame relay backbone to interconnect the office server and a home terminal and FIG. 26 shows a similar service process flow diagram for using the Internet to interconnect an office server and a home terminal.

FIGS. 25 and 26 each show service process flow diagrams for providing telecommuting services from the home. FIG. 25 is a service process flow diagram for showing how the NSP 36 in concert with an ISD 22 provides a telecommuting service via, for example, an employer's office server using a frame relay backbone to interconnect the office server and a home terminal. FIG. 26 shows a similar service process flow diagram for using the Internet to interconnect an office server and a home terminal. Home/office telecommuting is yet a further example of service connectivity by an NSP as already generally described by FIGS. 20 and 21. In the application involving a frame relay backbone as shown in FIG. 25 or in the Internet connect mode of operation shown in FIG. 26, any user may directly connect to their employer's office server. The employee may connect to their office server without having to connect via a local exchange carrier (LEC). The same convention as previously used with respect to FIG. 22 is used here as well. In FIG. 25, components of the system and service architecture are shown at the top including personal computer (PC) 1301, intelligent services director (ISD) 1303, facilities management platform (FMP) 1305 and network server platform (NSP) 1307. In FIG. 26, the same components are indicated prefaced by the figure number, for example, the facilities management platform is shown as FMP. In FIG. 25, a frame relay point of presence is shown as FR POP 1309. In FIG. 26, an Internet service provider point of presence is shown, for example, an AT&T WorldNet point of presence, as WNET POP 1409. In FIGS. 25 and 26, the employer office server is shown as Office SVR 1311 and 1411 respectively.

As already described, bandwidth to the home or premises of a business may vary but may be in excess of 1 megahertz according to bandwidth allocation procedures followed by the ISD 1303 or 1403 and FMP 1305 or 1405. In connections to the employer office server 1311/1411, it is desirable to achieve the greatest bandwidth or data rate possible. The employee would like to have the same access and data rate as if the employee were in fact at the location of the user's employer. In either connection of FIGS. 25 and 26, the maximum bandwidth may be achieved but may not be guaranteed in one case (FIG. 26).

Now referring to FIG. 25, the frame relay backbone approach to employee telecommuting will be discussed. While not particularly shown but suggested by FIG. 1 is the access via the NSP 36 to a frame relay backbone network off ring 42. A frame relay POP 1309 is not shown but may be provided off, for example, a SONET OC-48 ring network 42. Now an employee user of the present network service actuates telecommuting service by selecting, for example, a telecommuting icon from a menu structure displayed as a result of the process of FIG. 20. At step 1351, then, the user starts up the present telecommuting application by, for example, pointing to a telecommuting service icon and clicking or other selection means. It may be further assumed that the service may be identified by the service identifier "office". The service clicking and selection for an employer office connection is delivered to the ISD 1303 at step 1353. The ISD 1303 at step 1355 forwards an office service request message to NSP 1307 via FMP 1305. At step 1307, the network server platform performs a number of tasks. Firstly, the NSP 1307 validates the identity of the user forwarded to it by ISD 1303. The user having been validated by look up table, the user profile is retrieved showing what routing and other information is available for this user's request for LAN telecommuting service. The look-up process in NSP databases should show the accessibility to an office server 1311 associated with the user at personal computer or other terminal 1301 and, most importantly, that there exists a preconfigured connection between the FMP 1305 and the office server 1311 via a frame relay POP 1309. The NSP 1307 then provisions the FMP 1305 via step 1359 to provide resources such as LAN resources for reaching the office server 1311. Then a return message is provided by the FMP 1305 to the NSP 1307 acknowledging that the FMP is set up at step 1361. Once the NSP is satisfied that the FMP 1305 is ready, the NSP 1307 arranges at step 1363 to set up a private virtual circuit to the Office Server 1311 via FR POP 1309. Steps 1365 and 1367 show the establishment of a virtual circuit link between FR POP 1309 and Office SVR 1311. Once the PVC is set up, then an acknowledgment is returned by the FR POP 1309 to the NSP 1307 at step 1369. The NSP 1307 then forwards a service grant message to ISD 11303 at step 1371. Finally, the ISD 1303 signals the home terminal that the path is ready at step 1373. Now a communications link exists between the PC/ISD/FMP/FR POP/Office SVR. The user of terminal 1301 can begin to log in to the corporate LAN as if they were on site at step 1375. The connection is shown at step 1377 and assumes a high bandwidth connection at the maximum bandwidth the corporate LAN will allow.

Advantages of a frame relay POP mode of connection to an Office Server 1311 are that the connection is secure from intrusion and private to the user. Also, the bandwidth between the user and the corporate LAN is guaranteed. Of course, the guaranteed bandwidth comes at relatively high expense compared with Internet access and requires a preconfigured frame relay connection.

Referring now to FIG. 26, an Internet connection to an employer office server 1411 will be described. First, as before, the user indicates a preference for obtaining a telecommuting service by actuating an input signal at their terminal 1401 at step 1451. Steps 1453 and 1455 are similar to steps 1353 and 1355 but for the fact that NSP 1307 has provisioned the FMP and so the ISD to arrange for an Internet connection to an Office SVR 1411 either as an alternative to a frame relay POP connection or in place of the frame relay mode. Consequently, at step 1457, the step proceeds as before but for the selection of a connection path which now involves an Internet connection path. Steps 1459 and 1461 proceed as before except that a PPTP protocol is set up at step 1463 for data traffic to the office server. The FMP 1405 then tries out PPTP to and from the Office SVR 1411 via, for example, AT&T WNET POP 1409 at steps 1465 and 1467. If everything is ok, the FMP 1405 signals the NSP 1407 that the FMP is ready to communicate with the Office server 1411 via PPTP. The NSP replies by outputting a service grant to the ISD 1403 saying it is ok to begin telecommuting service via the Internet. At step 1473, the final step of the path to the terminal or PC 1401 is completed and the user can begin to log on to the corporate LAN at step 1475. Again, the maximum bandwidth is provided via Internet service that Internet service provides but the bandwidth cannot be guaranteed as another user at a premises where PC 1401 is located may take some bandwidth away. The service may be slow. Also, with Internet, there us a lot of packet overhead (extra bits that are not necessarily needed for information transfer). Yet, the connection will be complete and reasonably close in service quality to a user of a corporate LAN that is on site at step 1477. The Internet approach is inexpensive and requires minimal initial configuration.

FIG. 27 is a service process flow diagram for showing how the NSP in concert with an ISD at a user's home and via an FMP serving that user provides white and yellow pages directory services including home shopping and dialing services.

FIG. 27 illustrates another example of service connectivity by an NSP as already generally described by FIGS. 20 and 21. In the application shown in FIG. 27, any user may directly access white (private) or yellow pages (commercial) directory services at required bandwidth (bit rate) without having to connect via a local exchange carrier (LEC). The same convention as previously used with respect to FIG. 22 is used here as well. Components of the system and service architecture are shown at the top including intelligent terminal, video phone or personal computer (PC) 1501, intelligent services director (ISD) 1503, facilities management platform (FMP) 1505 and network server platform (NSP) 1507.

As already described, bandwidth to the home or premises of a business may vary but may be in excess of 1 megahertz according to bandwidth allocation procedures followed by the ISD 1503 and FMP 1505. Thus, there is a great advantage in a user having access to the directory services feature shown in FIG. 27 because the user has greater bandwidth availability and the user may immediately access directory services, for example, via NSP 1107 bypassing the LEC, and additional services and connections may be provided via the NSP (also bypassing the LEC) for home shopping, banking by phone, obtaining directions to a destination and the like as will be further discussed below.

Initially, the OAM&P server of the NSP 1505 provisions the directory service availability by signaling and provisioning the FMP 1505 with its address, routing and other data the FMP 1505 needs. The NSP itself 1507 has already been described as comprising a large database of data that may provide according to the present application at least local directory (both telephony and Internet) address/directory number services. Moreover, the NSP comprises significant caching memory and access to remote NSP's and other directory databases from which it may obtain further directory data.

Initial step 1551 of the service process flow diagram of FIG. 27 is directed to configuring the FMP 1505 to configure the ISD 1503 serving the user of PC 1501 for directory service routing to NSP 1507. As a result, the FMP 1505 updates its internal routing table of its memory with provisioned routing data for routing to NSP 1507 and for providing service via ISD 1503 to a particular user of terminal 1501.

Now, in step 1553, it may be assumed that a user has turned on their personal computer 1501 and wants to establish a directory session. As already described, one of the services that may be offered the user as a menu display option is directory service connectivity. The user clicks on or otherwise inputs their selection of directory service connectivity. The message forwarded as a result of the directory service can be the name, address or other indicia to be looked up. Also, a second column of the display may provide the desired output which may be directory number or Internet address but may also comprise, for example, directions for driving to a store nearest the user. The personal computer 1501 sends a lookup message with one or more of these requests to the ISD 1503 at step 1555. The ISD 1503 in turn obtains immediate access via the already provisioned FMP 1505 at step 1557 to the NSP 1507 where the local directory is located. The NSP 1507 now acts as an information database service provider and performs steps 1559. The NSP 1507 looks up the user's requested data and determines if it can provide the requested information itself. If NSP 1507 cannot provide the requested data look-up itself, it determines routing for a database having the requested information, collects the information and stores the information in cache memory for forwarding to the user along with any locally provided database information requested. Step 1561 suggests the return of the directory lookup result to the ISD 1561 for presentation to the user. Depending on the terminal, for example, the personal computer 1501, the ISD 1503 causes the result to be displayed at step 1563. Along with the result, the display may provide immediate dialing opportunity for a telephony directory number or immediate access to an Internet addressed web site.

For example, the user may wish to obtain a white pages listing for Tom Jones. The user may not know the city. The NSP 1507 may provide a directory service that identifies all individuals named Tom Jones in a geographical area such as the state of New York for possible review and selection. The user may continue to provide information until the selection process is narrowed to the Tom Jones that the user wishes to locate. Once the result of the search is narrowed sufficiently to where the user may make a choice, the choice may include a hot spot for an immediate connection. Moreover, Tom Jones may be located, not only at home, but at his work phone, cellular phone, pager, personal computer, facsimile machine or other number or web site.

In another application, the user may be trying to locate a drug store nearest them. The user inputs the request. Because the NSP receives data regarding the user's identity, the NSP further has access to a user profile including a home address. Consequently, using appropriate algorithms known in the art, the NSP 1507 locates the nearest drug store, the next nearest and so on for the user to chose one. Moreover, the display may provide essential information input by the drug store such as hours of operation. The hours of operation may be used as a filter to eliminate possible drug stores that in fact are not presently open at the user's request. The user may select to call the drug store of their choice and/or obtain directions from their home to the drug store.

In accordance with the directory look-up feature, the user may make repeated requests for the same or additional information. Moreover, once the user receives the directory look-up result, the result may provide hot spots or clicking selection opportunity to directly access the directory look-up result, for example, by telephony or the Internet at the highest bandwidth permissible or desirable. Thus, the directory look-up may be the first step toward home shopping, bank from home and other services. Note that the local exchange carrier is not involved and the bandwidth and data rate for exchange of Internet IP packets may be the maximum bandwidth permissible by the facility between the FMP 1505 and the PC or other terminal 1501.

FIG. 28 is a service process flow diagram for showing how the NSP in concert with an ISD at a user's home and via an FMP serving that user provides multicast audio and/or video program services or software, game and other program or information delivery services. FIG. 28 illustrates another example of service connectivity by an NSP as already generally described by FIGS. 20 and 21. In FIGS. 20 and 21, the present service is indicated in shorthand by the suggestion that the present service is like BlockBuster Video (TM), being able to receive movies or video games at home without having to go to the store to bring home the video or other program for play on a player. In the application shown in FIG. 16, any user may directly access multicast program services at required bandwidth (bit rate) without having to connect via a local exchange carrier (LEC). Pay-per-view, pay-per-listen, pay-per-play and other program delivery services may be provided from one or distributed sites from which the programs are multicast. Referring to FIG. 1, briefly, the multicast programs are receivable at any NSP 36 within reach of the SONET ring network 42. Moreover, the NSP 36 comprises a database with program availability and routing information.

In describing the multicast program services application of FIG. 28, the same convention as previously used with respect to FIG. 10 is used here as well. Components of the system and service architecture are shown at the top including intelligent terminal, video phone or personal computer (PC) 1601, intelligent services director (ISD) 1603, facilities management platform (FMP) 1605 and network server platform (NSP) 1607.

As already described, bandwidth to the home or premises of a business may vary but may be in excess of 1 megahertz according to bandwidth allocation procedures followed by the ISD 1603 and FMP 1605. Thus, there is a great advantage in a user having access to the multicast program services feature shown in FIG. 16 because 1) the user has greater bandwidth availability and 2) the user may immediately access multicast program services, for example, via NSP 1607 bypassing the LEC.

Initially, the OAM&P server of the NSP 1607 provisions the multicast program service availability by signaling and provisioning the FMP 1605 with its address, routing and other data the FMP 1605 needs. The NSP itself 1607 has already been described as comprising a large database of data that may provide according to the present application routing information needed for periodically receiving data from remote multicast server locations regarding availability to the user and routing information for receiving multicast programs. As is well known in the art, multicast audio and video programs may be provided in compressed format such as MPEG compressed format or other compression format.

The compressed program is decompressed preferably at the terminal 1601. On the other hand, if the terminal is not so equipped, decompression algorithms may reside in the ISD 1603.

Initial step 1651 of the service process flow diagram of FIG. 28 is directed to configuring the FMP 1605 to configure the ISD 1603 serving the user of terminal or PC 1601 for multicast program routing to NSP 1607. As a result, the FMP 1605 updates its internal routing table of its memory with provisioned routing data for routing to NSP 1607 and for providing multicast program services via ISD 1603 to a particular user of terminal 1601.

Now, in step 1653, it may be assumed that a user has turned on their personal computer or other terminal 1601 and wants to establish a multicast program session. As already described, one of the services that may be offered the user as a menu display option is a multicast program delivery service connectivity. The user clicks on or otherwise inputs their selection of multicast program service connectivity. The menu screen displayed as a result of the multicast program service can be tables of indicia to be looked up. For example, you know you want to see a movie starring Jimmy Stewart. You also know it is a Christmas movie. Using various selection algorithms within the design skills of one in the art, the selection may be narrowed to the well-known movie "It's a Wonderful Life" starring Jimmy Stewart about Christmas. Also, a second area of the display may provide the desired output which may be directory number or Internet address with information about the movie but may also comprise, for example, directions for driving to a movie theater nearest the user if the user wishes to see the movie at a theater instead of at their home terminal.

At step 1653, the user makes a selection of a video or other program title. As already described the program title may comprise a movie title, an audio album or song title and the like by program, title and artist or a game program or software program for download. At step 1655, the program title selection is forwarded to the ISD 1603. The ISD 1603 then formats a service request message describing the program to be delivered and service identifier data such as data representing a VIDEO service. The message is transmitted from the ISD 1603 via the FMP 1605 serving that ISD 1603 at step 1657 to NSP 1607.

At step 1659, the NSP 1607 validates the user and the requested service and obtains the user's profile from database memory. The user profile may provide the user's home address for locating a movie theater nearest them playing the desired movie or certain predetermined movie or other program preferences that can be used as a guide. Then, the NSP searches its database for movie or other program routing data to access the multicast program source and seek a download of the compressed program data.

Meanwhile, the NSP 1607 seeks the needed bandwidth for the program delivery service. Of course, audio program, software and game downloads may require less bandwidth than video. At steps 1661 and 1663, the NSP 1607 seeks to establish the necessary bandwidth at the FMP 1605 for receiving the needed resources. The FMP needs to assure a channel having the bandwidth required is available from the terminal or PC 1601 to the FMP 1605. The FMP 1605 then returns bandwidth and resource availability ok or not ok data to the NSP 1607.

If the movie is available on multicast and the bandwidth is available, then the NSP can issue a serviceGrant message for the desired video service to the ISD 1603 at step 1665. The ISD 1603 then signals the receiving device which may be a television, a recorder/player, a personal computer, a video phone, home theater center or other terminal or collection of terminals 1601 that it is ready to provide the service at step 1667. The final play connection is shown at step 1669.

FIG. 23 is a service process flow diagram for showing how the NSP in concert with an FMP provides Internet service connectivity via, for example, an Internet Service Provider's point of presence (POP) using AT&T's WorldNet Internet service as one example. FIG. 29 is a service process flow diagram for showing how the NSP may comprise cache memory and maintain a user profile such that the NSP may obtain information from various information service providers for forwarding and display to a user in accordance with their user profile.

FIG. 23 illustrates another example of service connectivity by an NSP as already generally described by FIGS. 20 and 21. In the application shown in FIG. 23, any user may directly connect to an Internet service provider (ISP) at great bandwidth (bit rate) without having to connect via a local exchange carrier (LEC). The same convention as previously used with respect to FIG. 10 is used here as well. Components of the system and service architecture are shown at the top including personal computer (PC) 1101, intelligent services director (ISD) 1103, facilities management platform (FMP) 1105 and network server platform (NSP) 1107. The Operations, Administration, Management and Provisioning server of the NSP 1107 is also shown as NSP OAM 1109. Finally, by way of example, a point of presence for an Internet service provider, namely AT&T's WorldNet service, is shown as Wnet POP 1111.

As already described, bandwidth to the home or premises of a business may vary but may be in excess of 1 megahertz according to bandwidth allocation procedures followed by the ISD 1103 and FMP 1105. Thus, there is a great advantage in a user having access to the Internet connectivity feature shown in FIG. 23 because the user has greater bandwidth availability and 2) immediate access to AT&T WorldNet, for example, via NSP 1107 bypassing the LEC.

Initially, the OAM&P server of the NSP 1109 provisions the Internet connectivity service by signaling and provisioning the FMP 1105 with address, routing and other data the FMP 1105 needs. Step 1151 is directed to configuring the FMP 1105 serving the user of PC 1101 for Internet service routing to, for example, AT&T WorldNet Internet Service point of presence 1111. As a result, the FMP 1105 updates its internal routing table of its memory with provisioned routing data for routing to Wnet POP 1111.

Now, it may be assumed that a user has turned on their personal computer 1101 and wants to establish an Internet session. As already described, one of the services that may be offered the user as a menu display option is Internet service connectivity. The user clicks on or otherwise inputs their selection of Internet service connectivity. The personal computer 1101 via the ISD 1103 obtains immediate access to the already provisioned FMP 1105 at step 1157 as the user's Internet session begins. At step 1157, Internet protocol (IP) data packets are forwarded and returned via the FMP 1105. The FMP 1105 now acts as a mini-server and performs steps 1159. The FMP 1105 looks up the user's packet header and compares the destination address against the routing table that was provisioned at step 1151. The routing table then provides routing data for routing the IP packets to, for example, AT&T WorldNet Internet service at Wnet POP 1111. Step 1161 suggests the routing of IP packets to the Wnet POP 1111 and an exchange of packets that follows via FMP 1105 to PC 1101. Note that the local exchange carrier is not involved and the bandwidth and data rate for exchange of Internet IP packets may be the maximum bandwidth permissible by the facility between the FMP 1105 and the PC 1101. FIG. 21 similarly describes the process of routing to other destinations of a routing table of FMP 1105 that has been provisioned by NSP OAM 1109. For example, besides serving as a gateway to the Internet, the NSP may provide a gateway to applets from a JAVA based server for such things as bill paying, utility meter reading, energy management, security services for any connected device, for example, a device at a customer premises (other than a personal computer) such as the VisionPhone described earlier or other device.

Referring now to FIG. 29, there is shown yet another example of service connectivity by an NSP as already generally described by FIGS. 20 and 21. In the application shown in FIG. 29, any user may enter and periodically update a user profile showing their interests and preferences. The NSP 1707 comprising significant cache memory can search for and obtain information directly related to the user entered preferences. When the user actuates their personal computer, the user may obtain the collected information that the NSP has collected on the user's behalf The same convention as previously used with respect to FIG. 10 is used here as well. Components of the system and service architecture are shown at the top including personal computer (PC) or network computer (NC) or other terminal 1701, intelligent services director (ISD) 1703, facilities management platform (FMP) 1705 and network server platform (NSP) 1707. Info #1 1709 and Info #2 1711 are shown by way of example as one ore more information service providers that the NSP 1707 may access for information. Finally, by way of example, AT&T information content servers as a group are shown as AT&T Content Servers 1713.

At step 1751, the personal computer, intelligent terminal, video phone or other terminal 1701 performs system/service initialization. Without a user profile, the service will not be able to retrieve any relevant information. There is a startup via a user interface applet, for example, by clicking on a user profile icon. Then, the user is presented with a user profile display or other input means for inputting information contents of interest to the user. The contents ultimately may refer to channels whereby the information can be obtained, for example, stock market ticker or sports ticker channels. Likewise, the contents may simply define a preference such as to information directed to genealogical research of an ancestor or hobby or scientific interests or pursuits.

At step 1753, the user profile for selected contents (information channels) is transmitted via the ISD 1703 and FMP 1705 for storage at the NSP 1707. The NSP 1707 then updates the user profile at step 1755 that is presently stored in memory or initializes the user profile in memory. The NSP 1707 then, once the use profile is known, can begin to search for relevant information at any and all information sources available on SONET ring network 42 (FIG. 1). The NSP

1707 then forwards an auto-start Info Receiver applet to the PC/NC 1701 for display, for example, as a menu selectable item or an icon or the like. Whenever the user accesses that applet, the collected information for their user profile is pushed to their terminal at step 1771.

However, prior to an information to terminal dump at step 1771, the NSP collects information from various sources at steps 1761, 1763 and 1765. The access to the information source may be via private line, shared line, Internet or telephony channels. For example, at step 1761 the information contents of Info #1 1709 relevant to the user profile is downloaded and stored in cache memory of NSP 1707 for that user to identify themselves and access. At step 1763, the information contents of Info #2 1711 relevant to the user profile is downloaded and stored in cache memory of NSP 1707 for the same user. Only two information sources are shown but many information sources may be queried and the query results downloaded to NSP 1707. Finally, via AT&T or other Internet service provider, the respective information content servers may be queried for relevant information and or channels (virtual or physical) realized and provided to NSP 1707. These may include stock market tickers, sports tickers, new tickers and the like of current interest. At either NSP 1707 or personal computer or network computer 1701, information filters may be used to only retrieve current data with respect to, for example, the stock portfolio or sports teams of interest to the user. Moreover, the NSP 1707 must periodically update the cache memory with newly received information relevant to the user's requests. A new information source may appear on the Internet or as a telephone listing or a new sports or other channel may be identified to NSP 1707 for polling. This is shown as step 1767.

In summary, then as shown at step 1769, the NSP 1707 caches contents from different sources (including from itself—for example—local directory listings and geographical location finding services). The NSP also polls contents from various sources to, for example, obtain updates or new information. At a user specified time interval or according to a user specified schedule as per their user profile, and according to a user specified priority ranking, the information may be ordered and delivered to the user via an information push at step 1771.

To illustrate the interaction between the various components of the instant invention, a voice dialing scenario will be described. When a user picks up the telephone and dials a series of numbers, after a period of time in which no additional numbers are entered, the intelligent service director 22 will start digitizing the voice information into 64 Kbps μ-law PCM data. The samples are then stored in a wave file, which is subsequently transmitted to the facilities management platform 32 over a signaling channel. On receipt by the facilities management platform 32, the facilities management platform 32 will forward the information to the network server platform. The network server platform will attempt to authenticate the request by ensuring that the subscriber does indeed have a subscription to the voice dialing service.

The network server platform can determine the identity of the subscriber by looking at the address in the IP field of the packet. The network server platform 36 can therefore interpret the information in the wave files and take the appropriate action. Let us assume that a first user wanted to call a second user. The network server platform 36 attempt to determine who the second user is as defined by the first user. Once the telephone number for the second user has been determined, the network server platform 36 will inform the facilities management platform 32 to set up a call to the second user. The facilities management platform 32 will then transmit a signal over the trunk lines requesting the second users local office to inform the NSP 36 the appropriate ports to use for setting up the call. The facilities management platform 32 has its own DTMF and tone generator which is used for signaling.

Note that there is a significant advantage implicit in the design. The voice dialing service is being provided locally and there is no need to pay for the local exchange carrier (LEC) for providing such a service. Similar services, such as speed dialing, that the LEC provides can now can be made available locally.

When an incoming call arrives from the PSTN, the facilities management platform 32 will obtain the signaling information from the modified digital loop carrier. The information will be dispatched over the signaling channel to the NSP 36. The NSP 36 will instruct the FMP 32 with information regarding call set up, connection and termination. On receiving this message, the FMP 32 will send the appropriate signaling message to the ISD 22. The ISD 22 knows the phones that are in use and those that are available for service.

While exemplary systems and methods embodying the present invention are shown by way of example, it will be understood, of course, that the invention is not limited to these embodiments. Modifications may be made by those skilled in the art, particularly in light of the foregoing teachings. For example, each of the elements of the aforementioned embodiments may be utilized alone or in combination with elements of the other embodiments.

We claim:

1. A systems management server for controlling user access to a plurality of communication networks, comprising:
   a router providing a gateway connection between said systems management server and said communication networks along at least one trunk line;
   an applications server coupled to said router along fiber distributed data interface (FDDI) ring;
   a database server for storing information supporting operation of said systems management server coupled along said fiber distributed data interface ring; and
   an operations, administration, maintenance, and provision server coupled to said fiber distributed data interface ring for supporting operation of said user access to said communications network.

2. The systems management server described in claim 1, where said trunk line connecting said router to said communication networks operates using SONET protocol.

3. The systems management server described in claim 1, where said trunk line connecting said router to said communication networks operates using a TR303 protocol.

4. The systems management server described in claim 1, where said communication networks includes a SS7 network.

5. The systems management server described in claim 1, where said communication networks includes a public switched telephone network.

6. The systems management server described in claim 1, where said communication networks includes a private Intranet.

7. The systems management server described in claim 1, where said communication networks includes an Internet.

8. A systems management server for controlling user access to a plurality of communication networks comprising:
- a router providing a gateway connection between said systems management server and said communication networks along at least one trunk line;
- an applications server coupled to said router along a fiber distributed data interface (FDDI) ring;
- a database server for storing information supporting operation of said systems management server coupled along said fiber distributed data interface ring;
- an operations, administration, maintenance, and provision server coupled to said fiber distributed data interface ring for supporting operation of said user access to said communication networks; and
- a connection manager coupled along said fiber distributed data interface ring supporting launching of applications stored in said applications server, said connection manager being capable of supporting said operations, administration, maintenance and provisioning server.

9. The systems management server described in claim 8, where said trunk line connecting said router to said communication networks operates using a SONET protocol.

10. The systems management server described in claim 8, where said trunk line connecting said router to said communication networks operates using a TR303 protocol.

11. The systems management server described in claim 8, where said communication networks includes an SS7 network.

12. The systems management server described in claim 8, where said communication networks includes a public switched telephone network.

13. The systems management server described in claim 8, where said communication networks includes a private Intranet.

14. The systems management server described in claim 8, where said communication networks includes a Internet.

\* \* \* \* \*